United States Patent
Ukyo et al.

(10) Patent No.: US 7,761,267 B2
(45) Date of Patent: Jul. 20, 2010

(54) MULTI-VARIABLE MODEL ANALYSIS SYSTEM, METHOD AND PROGRAM, AND PROGRAM MEDIUM

(75) Inventors: Tsuyoshi Ukyo, Yokohama (JP); Yuusuke Kageyama, Yokohama (JP); Keisuke Wakita, Yokohama (JP)

(73) Assignee: National University Corporation, Yokohama National University, Yokohama-shi (JP)

( * ) Notice: Subject to any disclaimer, the term of this patent is extended or adjusted under 35 U.S.C. 154(b) by 544 days.

(21) Appl. No.: 11/577,979

(22) PCT Filed: Oct. 25, 2005

(86) PCT No.: PCT/JP2005/019960

§ 371 (c)(1),
(2), (4) Date: Apr. 25, 2007

(87) PCT Pub. No.: WO2006/046737

PCT Pub. Date: May 4, 2006

(65) Prior Publication Data
US 2009/0132208 A1      May 21, 2009

(30) Foreign Application Priority Data
Oct. 26, 2004   (JP) .............................. 2004-310937
Mar. 9, 2005    (JP) .............................. 2005-066086

(51) Int. Cl.
G06F 17/50     (2006.01)
G06F 13/00     (2006.01)
(52) U.S. Cl. ............................... 703/2; 703/24; 700/28; 702/19
(58) Field of Classification Search ..................... 703/2, 703/24; 700/28; 702/19
See application file for complete search history.

(56) References Cited

U.S. PATENT DOCUMENTS

2003/0144746 A1 * 7/2003 Hsiung et al. ................. 700/28
(Continued)

FOREIGN PATENT DOCUMENTS

JP        2000-315218 A    11/2000
(Continued)

OTHER PUBLICATIONS

Gan Qiang et al., "CAE wo Mochiita Sharyo Seino Sekkei ni Okeru Sekkei Ryoiki wo Shimesu Shinsekkei Shuho no Kaihatsu," The Japan Society of Mechanical Engineers Dai 13 Kai Sekkei Kogaku System Bumon Koenkai Koen Ronbushu, Oct. 30, 2003, pp. 289 to 292.

(Continued)

*Primary Examiner*—Thai Phan
(74) *Attorney, Agent, or Firm*—Miles & Stockbridge P.C.

(57) ABSTRACT

A multi-variable model analysis system comprises a model creation unit for creating a plurality of models individually having a plurality of variables, a characteristic value calculation unit for calculating the characteristic values of the models on the basis of the variables of the models given and for writing the variables and characteristic values of the models, a clustering unit for classifying the plural models having the characteristic values of a high similarity, into an identical cluster; a correlation coefficient calculation unit for calculating the correlation coefficients of the variables of the models in individual clusters and for writing the correlation coefficients in a memory map; and an extraction unit for extracting the variable having a correlation coefficient exceeding a predetermined value in the individual clusters, from the memory map.

18 Claims, 31 Drawing Sheets

U.S. PATENT DOCUMENTS

2004/0162852 A1* 8/2004 Qu et al. ............. 707/104.1
2005/0105780 A1* 5/2005 Ioffe .................... 382/118
2005/0159896 A1* 7/2005 Ishikawa et al. ........... 702/19

FOREIGN PATENT DOCUMENTS

JP 2002-356106 A 12/2002

OTHER PUBLICATIONS

Program Product MIOS7/AS2 ETOILE/OP Tokei Bunseki Kino Kaisetsusho, First editions, Hitachi, Ltd., 1993, pp. 58 to 91.

Taichiro Ueda, "Personal Computer wo mochiita Data Mining Katsuyo Kanzen Master Manual," First edition, Nippon Bijinesu Report Kabushiki Kaisha, 1998, pp. 58 to 64.

* cited by examiner

DESIGN FACTOR: JUNCTION COORDINATES P(x,y,z) 21 FACTORS
VARIATION: ±50(mm), ±30(mm)
NUMBER OF ANALYSIS: 64 x 2 (ORTHOGONAL TABLE L64, NUMBER OF LEVELS: 4)
TEST: Bump・Rebound Input ±90(mm)

CAMBER ANGLE

⇒ GROUNDING PROPERTY OF TIRE & TURNING CHARACTERISTIC

TOE ANGLE

⇒ STRAIGHT-AHEAD STABILITY & AGILITY

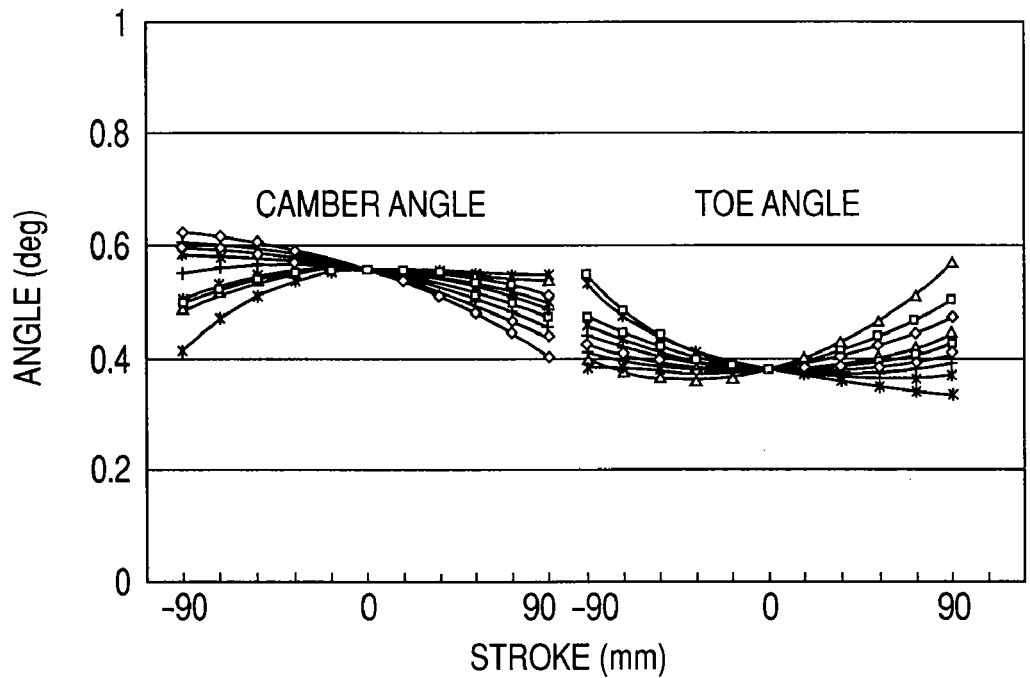
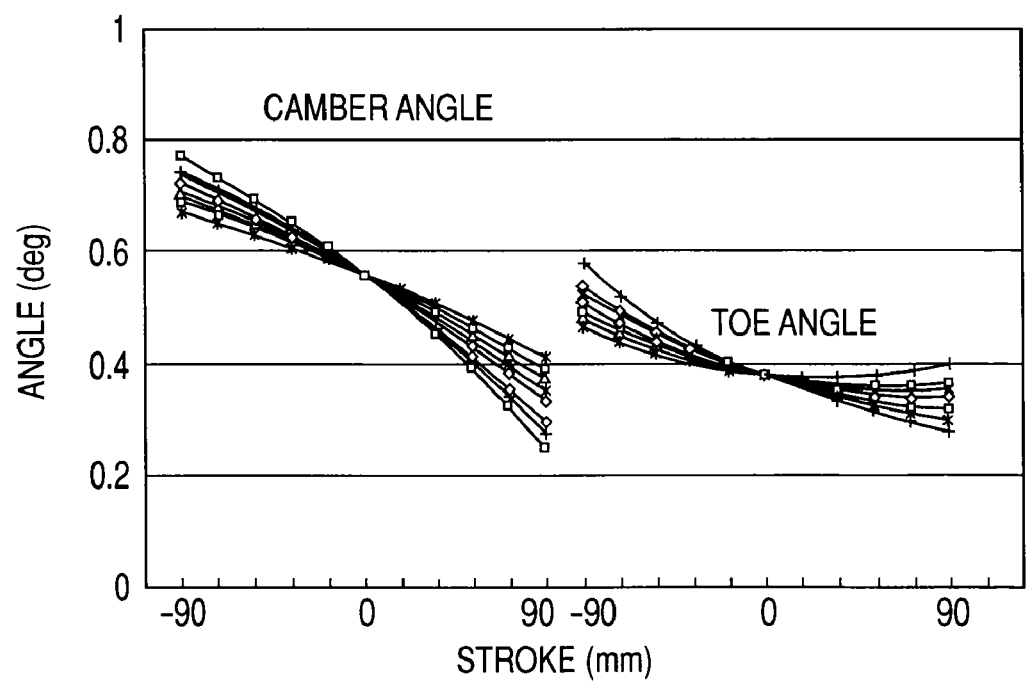

MULTI-VARIABLE MODEL ANALYSIS SYSTEM, METHOD AND PROGRAM, AND PROGRAM MEDIUM

TECHNICAL FIELD

The present invention relates to a multi-variable model analysis system, a method for the analysis and a program for the analysis of extracting a design principle such as a fundamental causal relation inherent in an analytic model by analyzing a relation between a plurality of variables and a characteristic value, and a program medium for the analysis.

BACKGROUND ART

As computer technologies have been developed recently, simulation systems and computer-aided engineering (CAE) have been widely used in many fields. For example, in the field of automobile design, the design has been performed based on the simulation using a theoretical formula of the whole automobile, which theoretical formula has been constructed by combining the theoretical formula of each part of the automobile. The theoretical formula is generally expressed by a relational expression between design variables such as the properties of the material, the size and the shape of a structure, and characteristic values such as a ride quality and noises. A desired design variable has been determined by performing the simulation of the characteristic values using the theoretical formula.

DISCLOSURE OF INVENTION

However, the number of the design variables becomes large in a complicated structure such as a suspension of an automobile, and the theoretical formula also becomes very complicated. Even if the simulation is performed using the theoretical formula determined in this way, it is very difficult to judge how to determine a design variables for obtaining a desired characteristic value. In automobile design, the characteristic values such as operational stability and a ride quality are determined based on the complicated interaction between a plurality of design variables, and each characteristic value is in the relation of a trade-off. The situation makes it difficult to determine these characteristic values and design variables.

Furthermore, in the case of a complicated structure, there are many design variables, and enormous amounts of calculations and time are needed for performing model simulation including a complicated theoretical formula. Consequently, the problem of the increases of a design time and a development cost has arisen.

As a conventional analysis system, a system described in, for example, Japanese Patent Application Laid-Open No. 2002-356106 was devised. The system is configured to include means for modelizing a tire to be a design object, means for inputting a vehicle, and a driving condition, and means for simulating the traveling of a tire modelized by an input variable. That is, the system is directed to perform precise simulation by modelizing the tire of a design object and by determining many variables such as an actual traveling state and the structure of the vehicle.

However, the more the number of the variables becomes, the more the theoretical formula of a design model becomes complicated. Consequently, it is not easy for a designer to understand the relation between the variables and the characteristic values. That is, it becomes difficult to grasp the design principle inherent in a design model from a complicated theoretical formula. Moreover, if the theoretical formula becomes complicated, the calculation amount and the time both of which are necessary for simulation also become enormous. Consequently, the problem of the increase of a design period and a development cost is also produced. Incidentally, the "design principle" is hereupon supposed to indicate the operation, the characteristic, a fundamental causal relation between each factor which relation is inherent in a design model. For example, in a suspension structure of a vehicle, physical causal relations inhere between design variables such as the coordinates of each link and characteristic values such as camber angles and toe angles, and the causal relations that are simplified to be easily grasped by a designer among the causal relations are called as design variables. If such causal relations are tried to be expressed by theoretical formulae, the expressed causal relations become very complicated, and the calculation amount of simulation also becomes enormous. Moreover, as other prior art, the design method described in Japanese Patent Application Laid-Open No. 2000-315218 was devised. The method calculates sensitivity by performing the stiffness evaluation of each part of a design model, and for setting the characteristics of the parts having relatively large sensitivity as design variables to reduce the number of the design variables used for an optimization calculation in a design of a structure model. That is, the method automatically selects the parts having higher sensitivity to enable the optimization calculation using fewer variables.

However, the method only enables the reduction of the design variables by simply referring to the sensitivity of each part, and does not extract the design principle inherent in the model to be a design object. Consequently, the method cannot extract the design principle connecting the design variables with characteristic values, and it is difficult for a designer to grasp the plan of design.

The present invention was made in view of the problems mentioned above. It is an object of the present invention to provide a multi-variable model analysis system, a method for the analysis and a program for the analysis capable of performing high-efficiency simulation and design by extracting a design principle in a multi-variable analytic model, and a program medium for the analysis.

For settling the aforesaid problems, the present invention includes a model creation unit for creating a plurality of models individually having a plurality of design variables, a characteristic value calculation unit for calculating the characteristic values of the models on the basis of the variables of the models given and for writing the variables and characteristic values of the models, a clustering unit for classifying the plural models having the characteristic values of a high similarity into an identical cluster, a correlation coefficient calculation unit for calculating the correlation coefficients of the design variables of the models in each cluster and for writing the correlation coefficients in a memory map, and an extraction unit for extracting the design variable having a correlation coefficient exceeding a predetermined value in the each cluster from the memory map.

Moreover, the model creation unit creates the models by determining the plurality of design variables using orthogonal tables.

The clustering unit performs clustering models in which distances between the characteristic values becomes the minimum into an identical cluster.

Furthermore, the correlation coefficient calculation unit calculates the correlation coefficients of the design variables by changing variants related to the design variables.

The extraction unit calculates an average value of the correlation coefficients of the design variables in a plurality of clusters, and extracts the design variable having the average value exceeding the predetermined value from the memory map.

Moreover, the multi-variable model analysis system further includes a database for performing preservation and retrieval of the design variables extracted by the extraction unit.

Furthermore, another aspect of the present invention includes a model creation unit for creating a plurality of models individually having a plurality of variables, a characteristic value calculation unit for calculating characteristic values of the models on the basis of the variables of the models given and for writing the variables and the characteristic values of the models, a clustering unit for creating a cluster group by classifying the plural models having the characteristic values of a high similarity into an identical cluster, the clustering unit disposing the cluster group in a space having a coordinate axes of the characteristic values to sample the clusters situated close a straight line, a curved line or a plane each of which shows a desired characteristic value change in the cluster group in order, and a principle extraction unit for obtaining how an average value of the variables of the models included in each of the sampled clusters in accordance with the order of the sampling by the clustering unit.

Moreover, the model creation unit creates a plurality of orthogonal tables by changing an array of a plurality of factors allocated in an orthogonal table, and creates the plurality of models using the orthogonal tables.

The present invention classifies the plurality of models having the high similarity and the approximate characteristic values into the identical cluster, and thereby performs the classification based on the values of the design variables exerting great influences on the characteristic values. That is, the sensitivity to the design variables exerting slight influences to the characteristic values can be lowered, and the design variables connected to the characteristic values strongly can be grasped.

Moreover, it becomes possible to grasp a design principle inherent in a model by calculating the correlation coefficients of the design variables mutually, and by extracting a plurality of design variables having high correlation coefficients. That is, because the design variables having the high correlation coefficients can be considered to exert influences on the characteristic values in interaction with one another, it becomes possible to extract the design principle inherent in a model based on the relations between the design variables and the characteristic values.

Moreover, the present invention creates the models using the orthogonal tables to enable the creation of the models having the design variables that do not duplicate with one another and have equal values. Consequently, efficient analysis can be performed using the minimum number of created models.

Furthermore, the present invention calculates the average value of the correlation coefficients of the design variables design variables in the plurality of clusters, and extracts the design variables having the average value exceeding the predetermined value. Thereby, the invention can grasp the design variables exerting influences on the characteristic values in conjunction with one another.

BRIEF DESCRIPTION OF THE DRAWINGS

FIG. 12 is a graph illustrating the camber angles and the toe angles of a cluster 1 according to the first example of the present invention;

FIG. 13 a graph illustrating the camber angles and the toe angles of a cluster 6 according to the first example of the present invention;

BEST MODES FOR CARRYING OUT THE INVENTION

In the following, the best embodiments of the present invention will be described, referring to the attached drawings.

(Whole Configuration)

Figure 1:
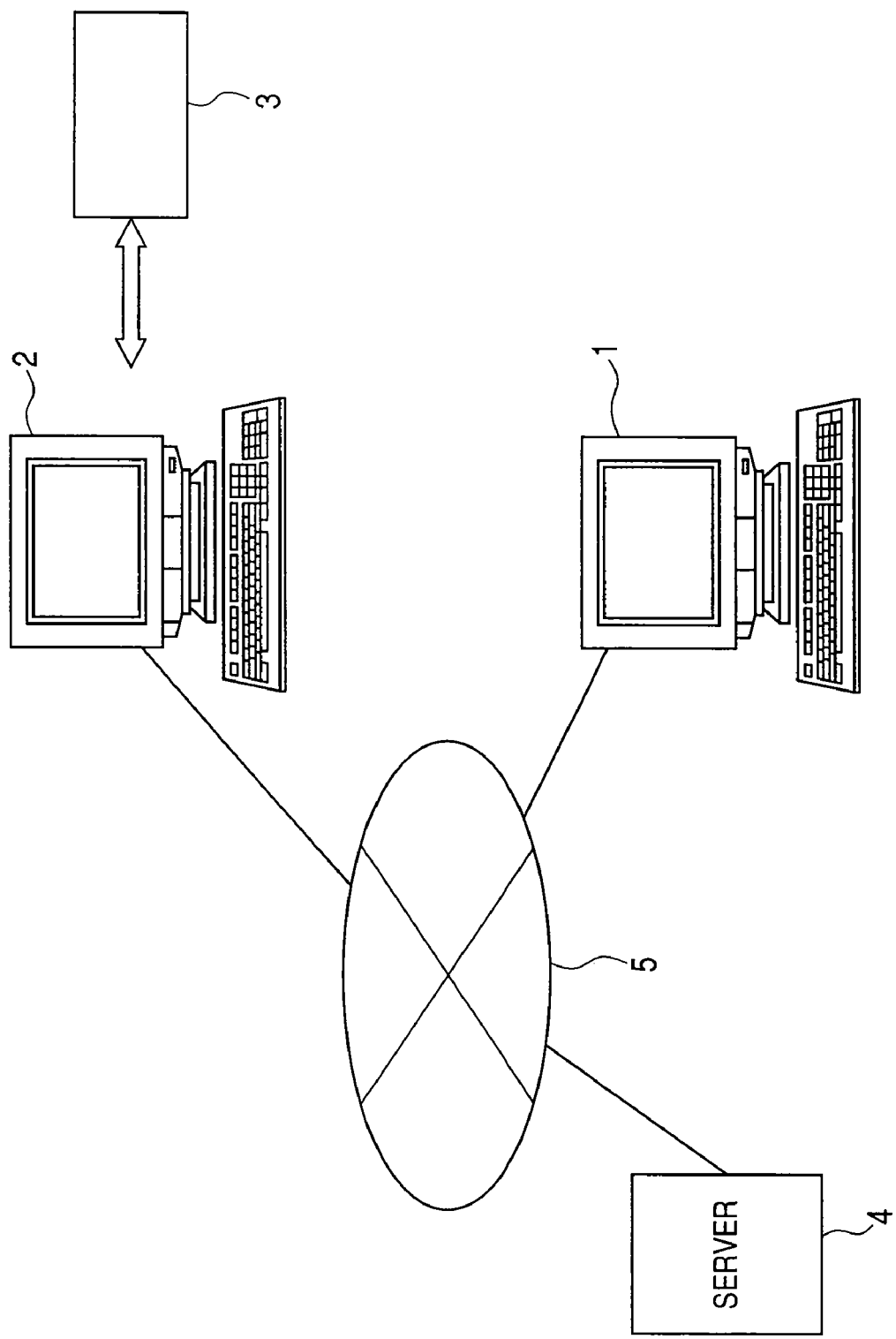
FIG. 1 is a general view illustrating an analysis system according to the present invention.

FIG. 1 illustrates the diagram of the whole configuration of an analysis system according to the present embodiment. The analysis system is configured to include a simulation terminal 1, an emulator terminal 2, a hardware interface 3, a server 4 and a network 5. The simulation terminal 1 is composed of a computer main body, a display, and a keyboard. The analysis system performs the simulation of an analytic model, and has the function of performing the extraction of the clustering of design variables and the design variables. Moreover, the simulation terminal 1 extracts a design principle inherent in an analytic model based on the extracted design variables, and can store the information as a database. Thereby, it is possible to retrieve the desired design information according to a request from a user.

The emulator terminal 2 is equipped with the hardware interface 3 for measuring the physical quantities of hardware made on an experimental basis. The emulator terminal 2 is used for performing detailed design by executing emulation by means of hardware in loop (HIL) based on the design variables calculated by the simulation terminal 1.

The server 4 is connected to the simulation terminal 1 and the emulation terminal 2 through the network 5 such as a LAN or a WAN for executing predetermined calculation processing in response to requests from the terminals 1 and 2. In the present embodiment, the server 4 can also execute simulation processing, and the retrieval of a database in place of the terminals 1 and 2 mentioned above. The server 4 is equipped with the function of preserving the simulation results such as the correlation coefficients calculated by the simulation terminal 1, and the design principles of models as a database, and of executing the retrieval of the database in response to a request of a user.

Figure 2:
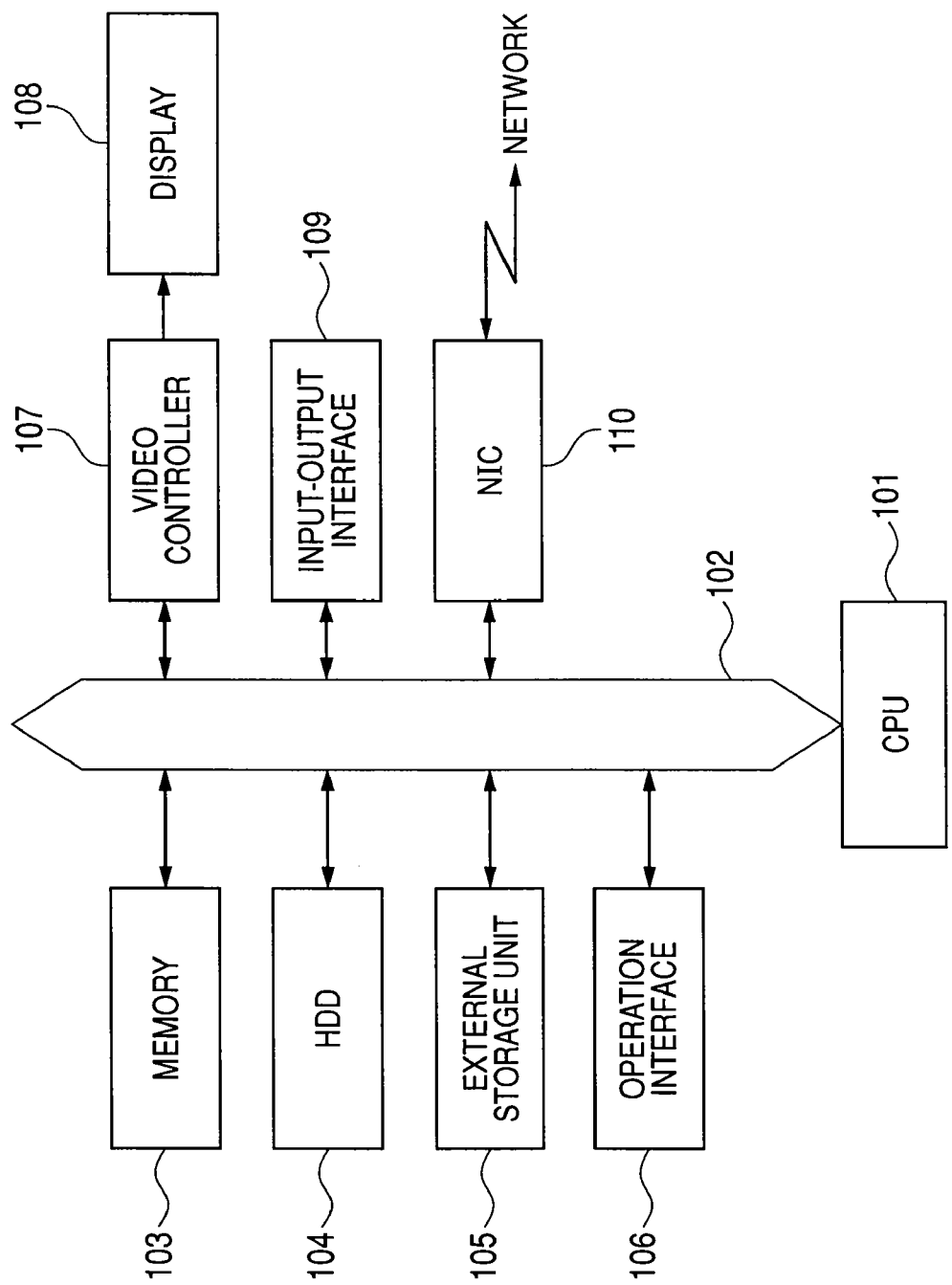
FIG. 2 is a block diagram of the hardware of the analysis system according to the present invention.

FIG. 2 is a block diagram illustrating the hardware of the aforesaid simulation terminal 1. The simulation terminal 1 is composed of a central processing unit (CPU) 101, a bus 102, a memory 103, a hard disk drive (HDD) 104, an external storage unit 105, an operation interface 106, a video controller 107, an input-output interface 109, an network interface card (NIC) 110, and a display 108.

The CPU 101 extracts the design variable area of a given analytic model, and executes the simulation calculation of the design variable area. The bus 102 is composed of a data bus and an address bus for performing the transfer of data between the CPU 101 and the devices such as the memory. The memory 103 is used as a work area for the CPU 101 to execute an analysis program, and the HDD 104 preserves the program, and is used for preserving the database such as simulation results.

The external storage unit 105 performs the reading and the writing of data to various storage media such as an MO, a CD, a CD-R, a CD-RW, a DVD, a DVD-R and a DVD-RW. It is possible to store an analysis program according to the present embodiment on the storage medium, and to preserve simulation results on the storage medium.

The operation interface 106 is an interface with input devices such as a keyboard and a mouse, and a user can give the simulation terminal 1 the specification of an analytic model and the instruction of the retrieval of a database through the input devices. The video controller 107 is equipped with a graphic memory, and a 3D graphic controller, and is equipped with the function of converting an analytic model, and the graph of a simulation result into image signals. The display 108 is constructed of a CRT, or a liquid crystal display for displaying an image based on an image signal from the video controller. The input-output interface 109 is constructed of a USB, a serial port, or a parallel port, and is used for the connection with an external device such as a printer and the simulation terminal 1. NIC 110 is a network adapter for connecting the simulation terminal 1 with Ethernet (registered trademark), and the Internet. It is also possible to download an analysis program from the server 4 to the simulation terminal 1 through the NIC 110.

Figure 3:
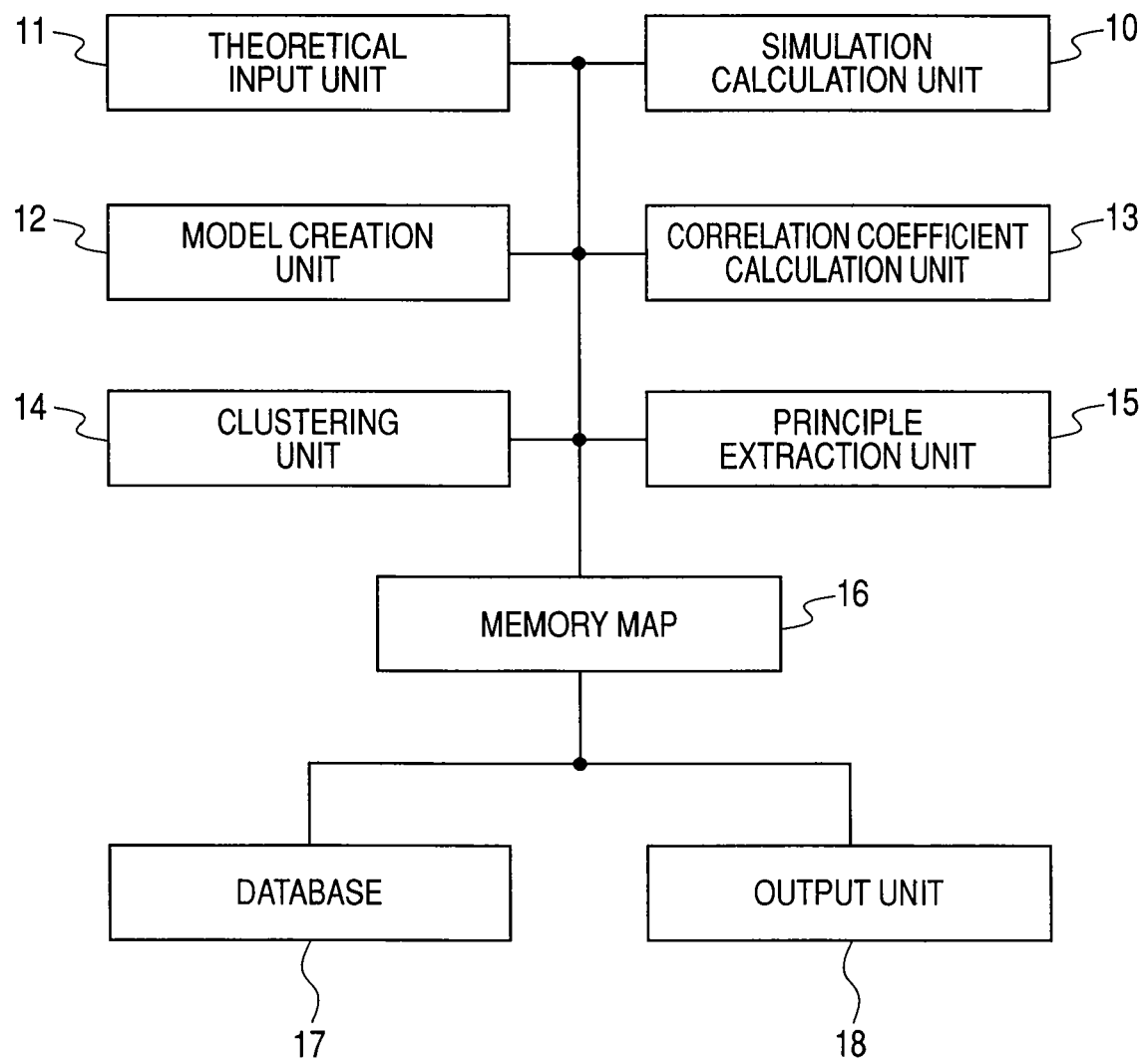
FIG. 3 is a functional block diagram of the analysis system according to the present invention.

FIG. 3 is a functional block diagram of the analysis system according to the present embodiment. In the diagram, a theoretical formula input unit 11 determines the theoretical formula of a model of an analysis object. The theoretical formula expresses various models of the objects of the simulations of a mechanical structure such as a vehicle, an electronic circuit and an economic phenomenon, and the theoretical formula expresses the relations between a plurality of design variables and a characteristic value (function value) in the form of a numerical formula.

A model creation unit 12 creates various models by determining a plurality of values of the design variables in the theoretical formula input from the theoretical formula input unit 11. It is supposed hereupon that an orthogonal table is used in order to determine equal and balanced design variables. The orthogonal table is constructed of a table in which all the levels of factors (design variables) are equally allocated. For example, the orthogonal table having four factors of two levels is a table in which 1 and 2 are equally allocated to each of the four factors, and it becomes possible to determine each value of the four design variables using the orthogonal table. Although it is to be desired to use the orthogonal table in this manner in order to create equal design variables, the design variables may be created in a quasi equal state by means of random numbers.

Figure 26:
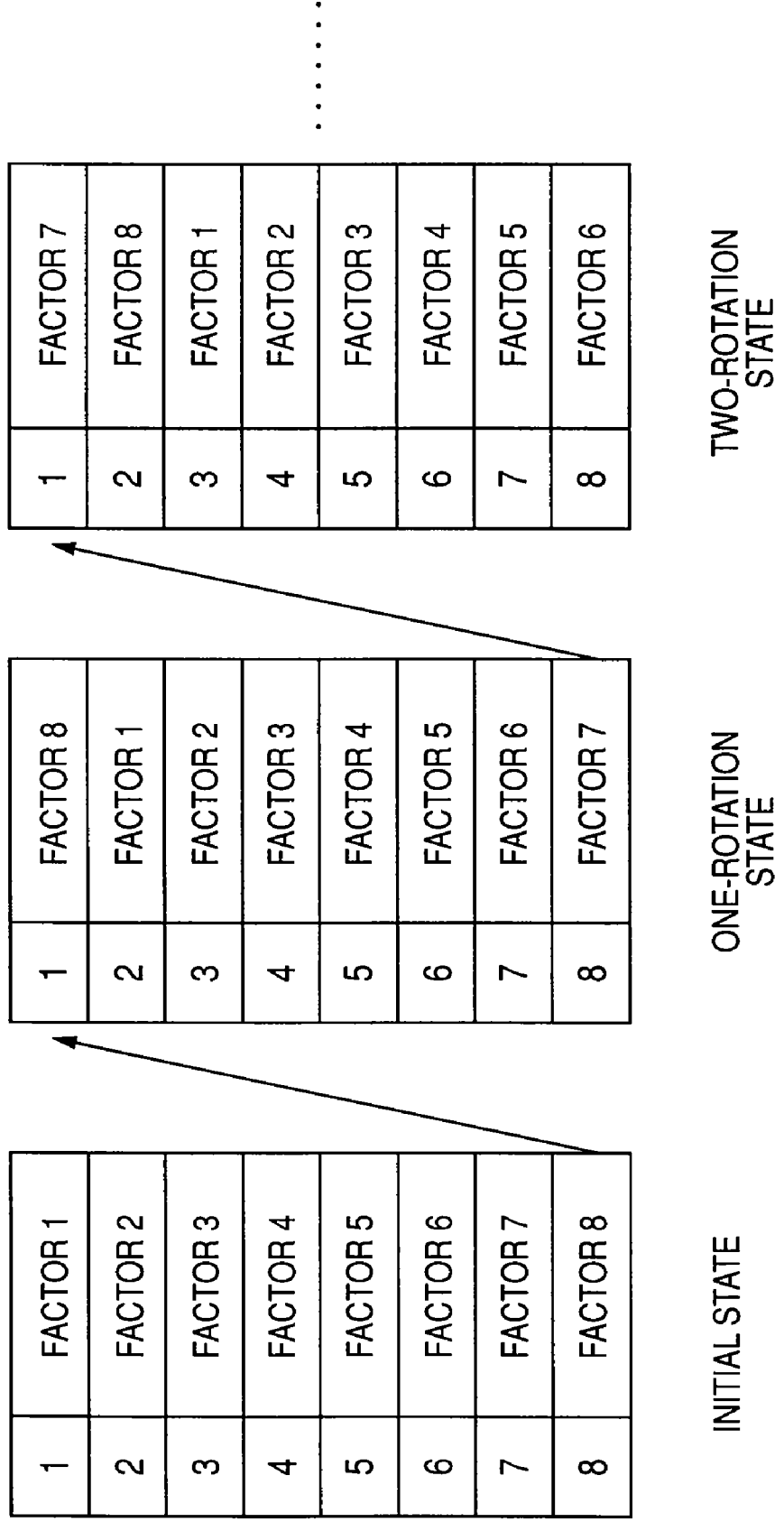
FIG. 26 is a diagram for illustrating orthogonal tables according to the present invention.

Incidentally, it is possible to create a plurality of orthogonal tables by rearranging each factor of a given orthogonal table, and to increase the number of the design variables to be sampled using the thus produced plurality of orthogonal tables. As the rearranging technique, a technique of shifting (rotating) each factor as shown in FIG. 26 can be cited. For example, eight kinds of orthogonal tables can be created by rotating the orthogonal table having eight factors by seven times in order, and consequently the design variables of 64×8=512 models in total can be equally created. That is, N types of orthogonal tables can be created by rotating the orthogonal table having N factors by (N−1) times. Incidentally, the array of the factors of an orthogonal table may be altered by other methods such as the method of altering the array of the factors in a random manner.

A simulation calculation unit 10 calculates a characteristic value by assigning each design variable created by the model creation unit 12 to the theoretical formula. For example, in the case where 128 models have been created by the model creation unit 12, 128 data set including characteristic values and design variable values have been created. Although it is preferable that the simulation calculation unit 10 can perform calculation accurate as high as possible, the simulation calculation unit 10 can be constructed of a general purpose simulation system. As described above, because the number of the design variables to be calculated is limited by the design variable creation unit 12, the calculation amount of the simulation calculation unit 10 can be suppressed to be the minimum.

A clustering unit 14 classifies the models having similar characteristic value changes using a hierarchical clustering technique. A plurality of models having similar characteristic value changes to one another exists among a plurality of models, and the former models are classified into one cluster. That is, a distance between a characteristic value of a certain model and a characteristic value of another model is calculated to each design variable, and the models to which the total sum of these distances is the minimum are classified into the same cluster. Incidentally, it is also possible to perform the clustering using a technique such as the group average method in addition to the aforesaid minimum distance method. The clustering unit 14 can create hierarchically classified clusters by classifying the thus classified clusters as the higher rank clusters in order.

It is possible to perform the classification based on the values of the design variables exerting large influences on characteristic values by classifying the models having similar characteristic values to the same clusters in this manner. That is, it becomes possible to lower the sensitivities of the design variables exerting small influences on the characteristic values, and to extract the design variables exerting large influences on the characteristic values.

A correlation coefficient calculation unit 13 calculates a correlation coefficient between design variables in each cluster. For example, when a variant or a characteristic value that is related to a design variable is changed, two design variables X and Y show predetermined changes. Hereupon, the presence or absence of the correlation of the changes of the two design variables can be expressed by the correlation coefficient of the following formula:

$$r=\{(x1-x0)(y1-y0)+(x2-x0)(y2-y0)+\ldots(xn-x0)(yn-y0)\}/(n\delta x\delta y),$$

where x0 and y0 indicate the average values of x and y, respectively, and δx and δy indicate the standard deviations of x and y, respectively. The correlation coefficient r becomes a value within a range of $-1 \leq r \leq 1$. When positive correlation is strong, r shows a value near 1. When negative correlation is strong, r shows a value near −1.

The phenomenon that a correlation coefficient between design variables is strong can be considered to indicate that these design variables exert influences on characteristic values in conjunction with each other. Moreover, these mutually correlated design variables generally exist in each cluster in common, and these design variables are generally closely related to the design principle inherent in the model. Accordingly, it becomes possible to extract a design principle in a multi-variable model by finding out variables having a strong correlation with each other in each cluster.

A principle extraction unit 15 extracts a design principle inherent in a model based on each cluster. That is, the principle extraction unit 15 calculates an average of the correlation coefficients in each cluster, and obtains the connection of the design variables having strong correlations in all the clusters. These design variables generally exert influence on characteristic values in conjunction with one another, and it becomes possible to grasp the design principle inherent in a model by diagrammatizing the relations between these design variables and characteristic values. For example, if three design variables have strong positive correlations with each other among a plurality of design variables, it is known that a desired characteristic value is obtained by altering these design variables similarly. A user can grasp the design principle of a model of an analysis object by diagrammatizing the relations between these design variables and characteristic values.

Incidentally, it is possible to automatically perform the extraction of design variables by previously determining a threshold value of correlation coefficients. Moreover, it is possible to automatically extract design principles inherent in a model by calculating the relations between changes of the extracted design variables and characteristic values by the simulation calculation unit 10.

Incidentally, a user may perform the extraction processing of design principles by displaying the correlation coefficients.

An output unit 18 visually presents the aforesaid processing results to a user. For example, it is possible to display classified clusters, correlation coefficients between design variables in each cluster, relational expressions between extracted design variables and characteristic values. Moreover, the output unit 18 may transmit the processing results to other terminals through the network.

A database 17 enables retrieval by storing the processing results as a database. That is, it becomes possible to retrieve desired data among stored many pieces of processed data such as classified clusters, correlation coefficients, and extracted design principles for utilizing them by previously storing the data into the database 17.

A memory map 16 keeps the processing results in each of the theoretical formula input unit 11, the model creation unit 12, the simulation calculation unit 10, the correlation coefficient calculation unit 13, the clustering unit 14 and the principle extraction unit 15. Each processing unit can transfer processing results to other processing units through the memory map 16.

Successively, the operation of the analysis system according to the present embodiment will be described, referring to the flow charts of FIGS. 4 and 27.

<First Analysis Method>

Figure 4:
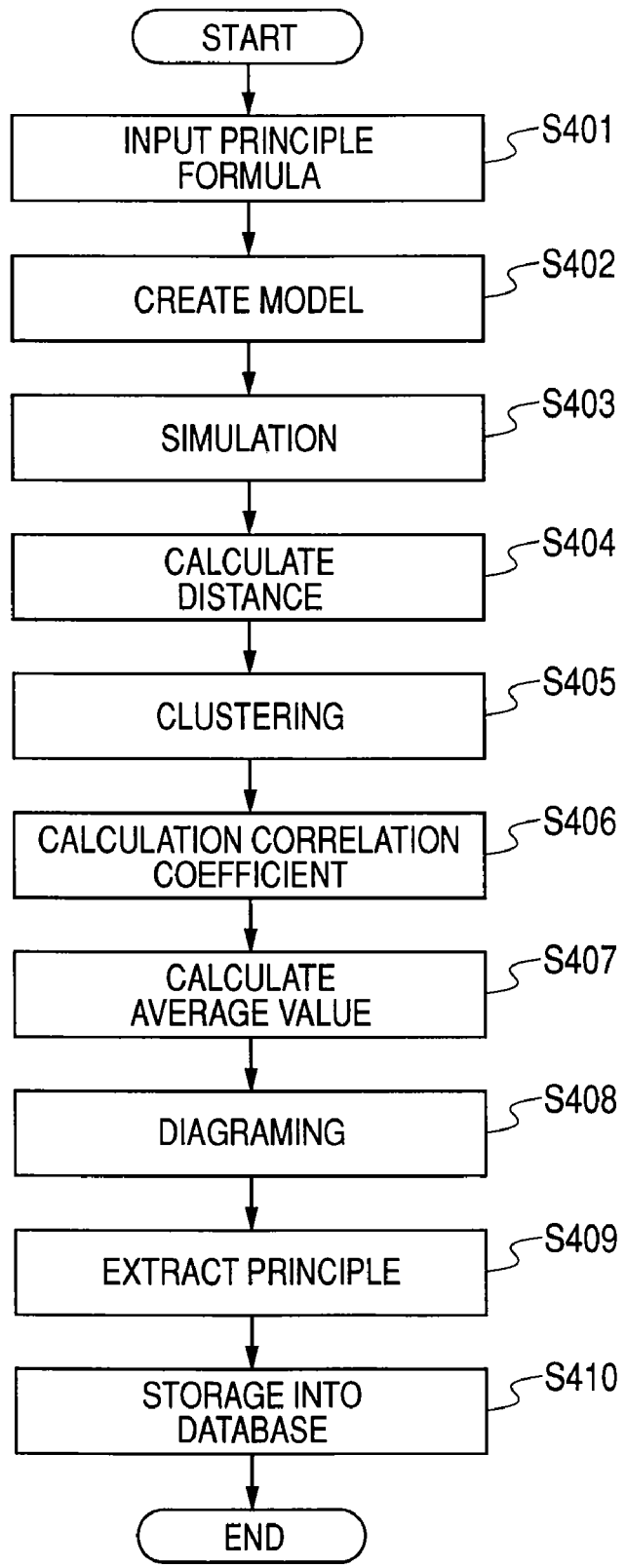
FIG. 4 is a flow chart illustrating the operation of the analysis system according to the present invention.

The analysis method shown in FIG. 4 is the method for seeking a plurality of design variables mutually exerting influence on characteristic values to extract a design principle inherent in a model by calculating the correlation coefficients of respective clusters.

(Creation of Model)

First, a user determines the theoretical formula of the model of an analysis object, and inputs the determined theoretical formula into the theoretical formula input unit 11 (Step S401). If the analysis object model is a mechanical structure, the user expresses the three-dimensional coordinates of each unit of the structure as design variables, and determines the theoretical formula expressing strength and noises as characteristic values. Moreover, if the analysis object model is a semiconductor device, the user expresses distances between wires, and electrode areas as design variables, and can determine a theoretical formula expressing delay times as characteristic values. Furthermore, also in the case of the model of an economic phenomenon, the user can also extract the principle of the economic phenomenon by determining theoretical formulae between design variables and characteristic values. As mentioned above, the model of an analysis object is not limited to physical models, but may be various models such as economic models.

The model creation unit 12 concretely determines the values of design variables in the determined theoretical formula to create a plurality of models (Step S402). That is, the model creation unit 12 can create a plurality of models that are equal and are not duplicated by the determination of each design variable using an orthogonal table. Incidentally, it is to be desired that the creation number of models is a sufficient number, such as 128, for extracting design principles. The models created in this way are stored in the memory map 16.

The simulation calculation unit 10 performs the simulation of the created models (Step S403). That is, the simulation calculation unit 10 assigns the values of the concretely determined design variables into the theoretical formula to calculate characteristic values. The combinations of the characteristic values calculated in this way and the design variables are preserved into the memory map 16 as one data set to each model.

(Clustering)

Successively, the clustering unit 14 calculates the distances between characteristic values of each model (Step S404). There are models the changes of the characteristic values of which are similar among, for example, 128 models, and the distances between such characteristic values become short ones. The clustering unit 14 classifies the models having the characteristic values the distances of which are mutually short into one cluster (Step S405). The changes of the characteristic values of the two models classified in this way become similar to each other. Furthermore, the clustering unit 14 performs hierarchical clustering by classifying each cluster into a higher rank cluster.

(Calculation of Correlation Coefficient)

The correlation coefficient calculation unit 15 calculates the correlation coefficients of design variables in the clusters obtained by the processing mentioned above (Step S406). That is, the correlation coefficient calculation unit 15 obtains the changes of the design variables in the case of changing the characteristic values within a certain range, and calculates the correlation coefficients between the design variables at this time.

(Diagramming)

Figure 6:
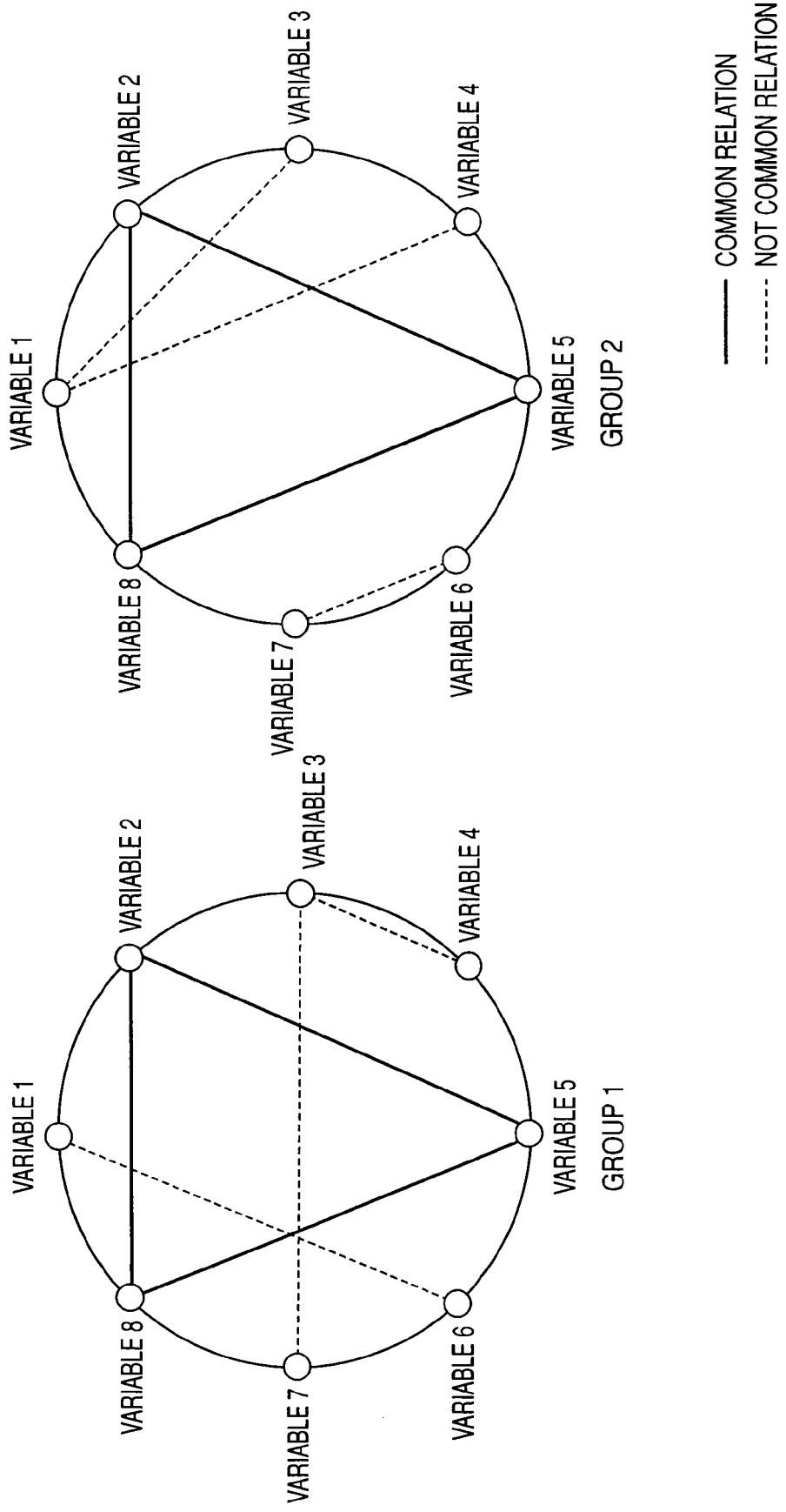
FIG. 6 is a conceptual diagram of the analysis system according to the present invention.

If the values of the correlation coefficients calculated in this way are, for example, 0.9 or more, the correlation of the design variables is considered to be strong. FIG. 6 illustrates an example of the strength of correlations of design variables. In the drawing, clusters 1 and 2 include models having design variables 1-8, the models classified into the same cluster have similar characteristic value changes. The design variables having strong correlations with each other among the design variables 1 to 8 are connected with each other by solid lines, and the ones having weak correlations are shown to be connected with broken lines. It becomes possible to visually grasp the design variables in conjunction with each other by diagramming the strength of the correlations of the design variables in this manner.

(Extraction of Design Principle)

Successively, the clustering unit 14 calculates the average values of the correlation coefficients of the design variables among the plurality of clusters (Step S407). It can be confirmed in each cluster in FIG. 6 that the design variables 2, 5 and 8 have strong correlations mutually, and that the strength of the correlations of these design variables is in common in any of the clusters 1 and 2. Consequently, also in the average values of the correlation coefficients of the design variables of these clusters, the correlation coefficients of the design variables 2, 5 and 8 show high values. That is, the design variables 2, 5 and 8 have strong correlations in common in the models classified into any clusters, and it is known that the design variables 2, 5 and 8 exert influence on the characteristic values in conjunction with one another.

Figure 5:
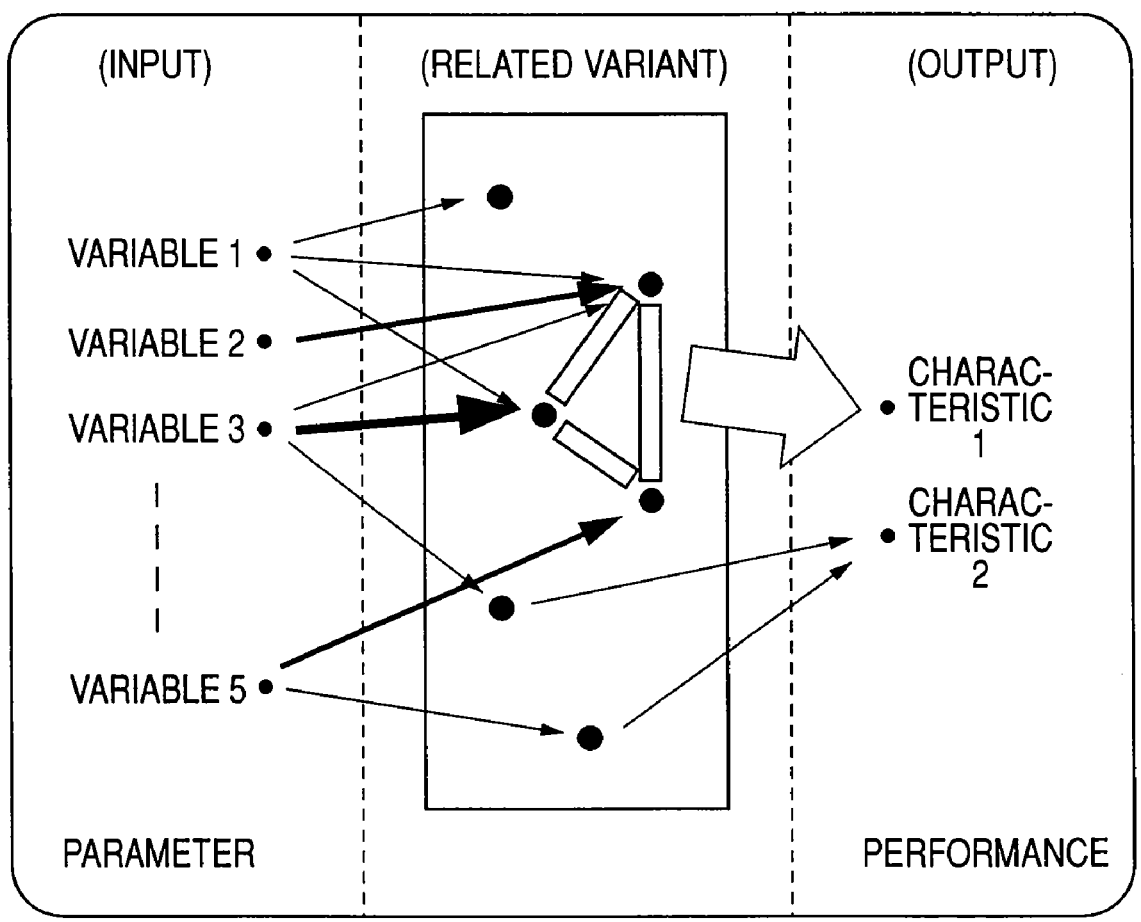
FIG. 5 is a flow chart illustrating the operation of the analysis system according to the present invention.

Moreover, it is possible to visually grasp the design principle of the model of the analysis object by diagramming the changes of these design variables and characteristic values (Step S408). Furthermore, the principle extraction unit 15 extracts the design principle inherent in the model based on the relations between the design variables having mutual strong correlations and the characteristic values (Step S409). For example, it is supposed that the analysis object model has design variables 1 to 5 and characteristic values 1 and 2, as shown in FIG. 5. The design variables 1 to 5 have certain relations with the characteristic values 1 and 2. In the drawing, the relations having strong correlations are shown by thick arrows. Moreover, thin arrows indicate that correlations are weak, and the variables that are not connected with characteristic values with arrows indicate that the variables have few correlations. The variables 2, 3 and 5 mutually have strong correlations, and it is possible to visually show the design principle inherent in the model by expressing the connections between these variables and a characteristic value 1 by the arrows as shown in the drawing.

(Database Storage)

The thus created data such as the model, the clusters and the design principle are preserved by the database 17. The user can retrieve desired data from the data preserved in the database 17 to use the retrieved data for a design.

<Second Analysis Method>

Figure 27:
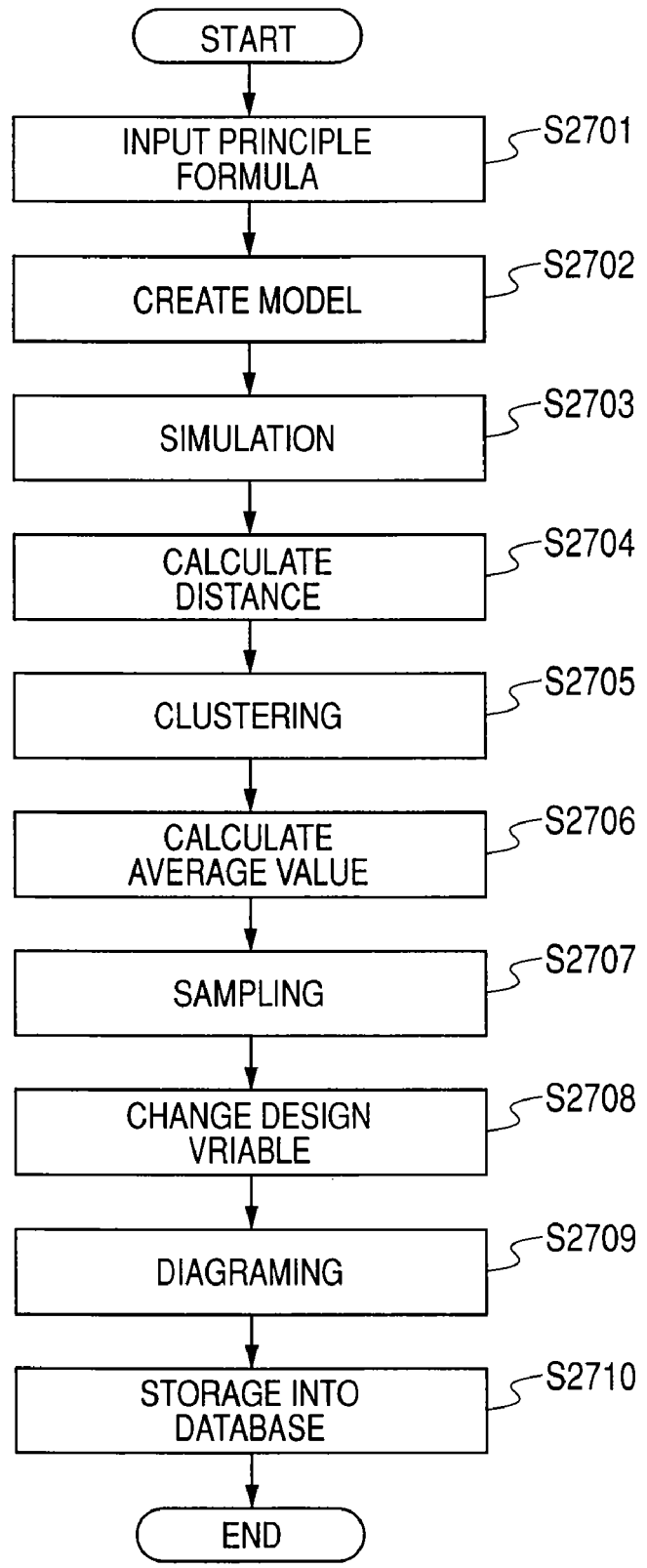
FIG. 27 is a flow chart illustrating an operation of the analysis system according to the present invention.

The analysis method shown in FIG. 27 is the method aiming to extract the design principle inherent in a model by sampling a plurality of clusters that a predetermined plane or a predetermined straight line traverses in order among the cluster groups distributed in a space to change design variables in the order of the sampling.

(Creation of Model)

In the drawing, a user first determines the theoretical formula of the model of an analysis object, and inputs the determined theoretical formula into the theoretical formula input unit 11 (Step S2701). Similarly to the first analysis method, the analysis object model is not limited to the physical models such as a mechanical structure, but can be applied to various models such as a communication network and an economic model.

The model creation unit 12 concretely determines the values of design variables in a determined theoretical formula to create a plurality of models (Step S2702). That is, the model creation unit 12 can create a plurality of models that are equal and are not duplicated by the determination of each design variable using an orthogonal table. Incidentally, it is to be desired that the creation number of models is a sufficient number, such as 128, for extracting design principles. The models created in this way are stored in the memory map 16. Incidentally, the models may be created based on a plurality of orthogonal tables created by the rotation of one orthogonal table, or may be created using random numbers.

(Simulation)

The simulation calculation unit 10 performs the simulations of the created models (Step S403). That is, the simulation calculation unit 10 assigns the values of the concretely determined design variables into the theoretical formula to calculate characteristic values. The combinations of the characteristic values calculated in this way and the design variables are preserved into the memory map 16 as one data set.

(Clustering)

Successively, the clustering unit 14 calculates the distances between characteristic values of each model (Step S404). There are models the changes of the characteristic values of which are similar among, for example, 128 models, and the distances between such characteristic values become short ones. The clustering unit 14 classifies the models having the characteristic values the distances of which are mutually short into one cluster (Step S405). The changes of the characteristic values of the two models classified in this way become similar to each other. Furthermore, the clustering unit 14 performs hierarchical clustering by classifying each cluster into a higher rank cluster.

(Calculation of Average Value)

The clustering unit 14 calculates the average value of a plurality of design variables included in each cluster, and extracts the feature of each cluster (Step S2706). The calculated average value is stored in the memory map 16.

(Sampling of Clusters)

Figure 28:
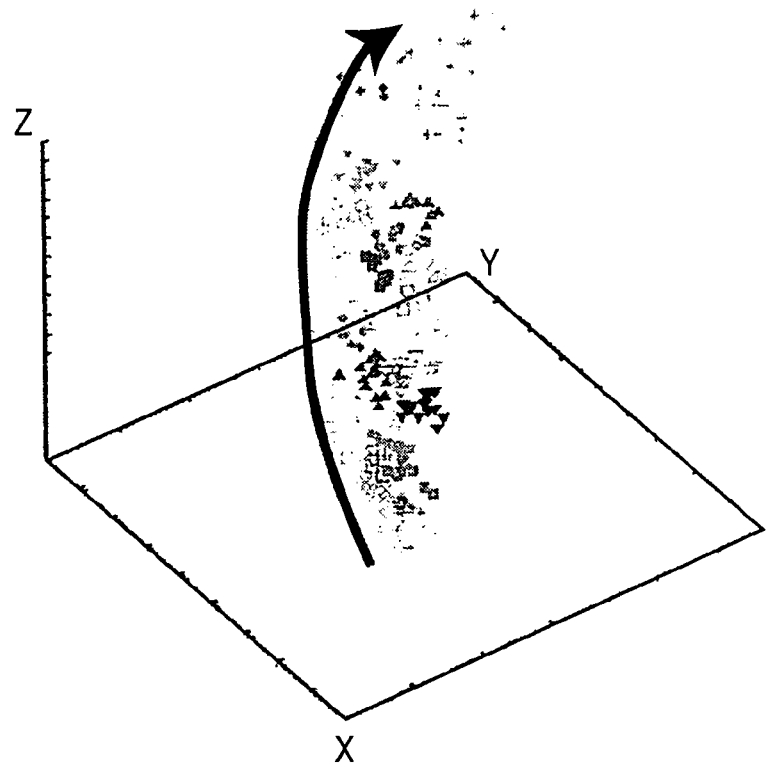
FIG. 28 is a view for illustrating a sampling method of a cluster according to the present invention.

Furthermore, the clustering unit 14 arranges the cluster groups in an N-dimensional space using each of N characteristic values as a coordinate axis. For example, if there are three characteristic values, cluster groups are arranged in a three-dimensional space, as shown in FIG. 28. And, the clustering unit 14 samples the clusters intersecting with a desired curved line and a desired curved surface in order to the cluster groups in the space (Step S2707). The curved line and the curved surface for the sampling can be determined in consideration of the characteristic value to be regarded as important. For example, the curved line shown by the arrow in FIG. 28 is supposed so that the characteristic values corresponding to the Z-axis among the cluster groups are greatly changed, and that the characteristic values corresponding to the X-axis are changed a little, and further that the characteristic values corresponding to the Y-axis are made to be almost constant. The sampling unit 14 samples the clusters intersecting with the curved line in accordance with the direction of the arrow in order.

Incidentally, the curved line and the curved surface for sampling are not only determined by an operator in an interactive mode with the operator observing the cluster groups displayed on the display 108, but the curved line and the curved surface may be automatically determined by the sampling unit 14. For example, the sampling unit 14 can automatically detect the envelope curves and the envelope surfaces both of which surround the cluster groups, and can sample the clusters along these curved lines and curved surfaces. Moreover, the sampling unit 14 may automatically detect straight lines and planes that traverse the cluster groups and are parallel to any of the space coordinate axes.

(Diagramming)

Figure 29:
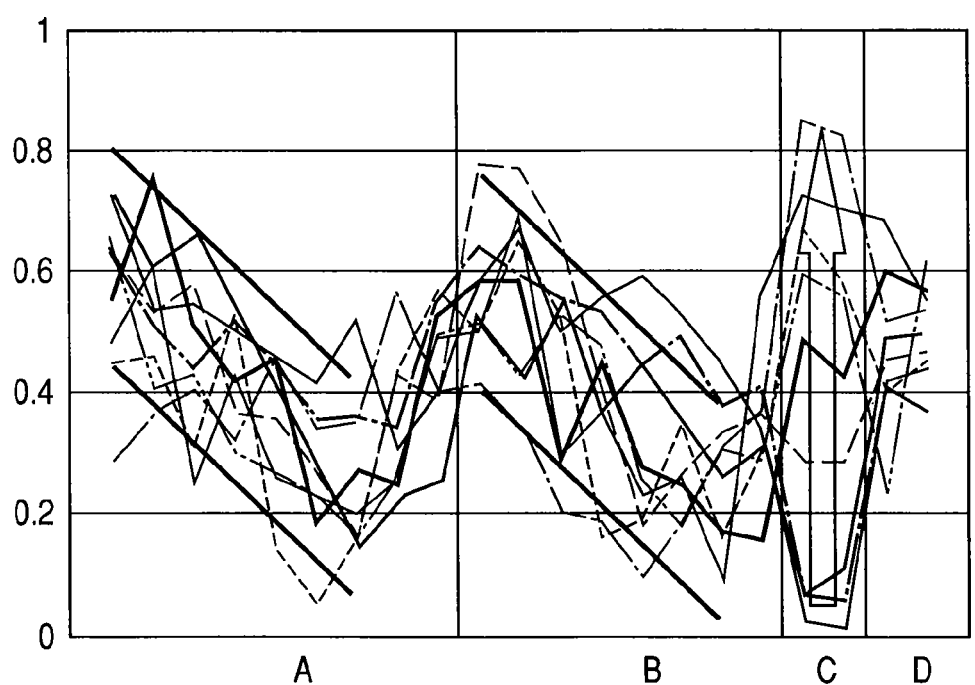
FIG. 29 is a graph illustrating average values of the design variables of each cluster according to the present invention.

Successively, the principle extraction unit 15 judges how the design variables change by changing the design variables in each sampled cluster in the order of the sampling of the clusters. For example, it is supposed that a design variable C has changed as shown by an arrow in the order of the sampling of the clusters, as shown in FIG. 29. In this case, it is known that the characteristic values change as shown by the arrow in FIG. 28 by changing the design variable C in the direction of the arrow in FIG. 29. That is, a desired characteristic value and the design variable related to the characteristic value can be extracted, and it becomes possible to grasp the method of changing design values in order to obtain a desired characteristic value.

As shown in FIG. 28, diagramming the changes of design variables enables not only the extraction of the design principle inherent in a model, but also the visual grasp of the relation between the changes of design variables and the changes of characteristic values.

(Database Storage)

The graphs and the data that have been obtained by the processing mentioned above are preserved in the database 17 (Step S2710). The user can retrieve desired data from the data preserved in the database 17 to use the retrieved data for a design.

EXAMPLE 1

Figure 7:
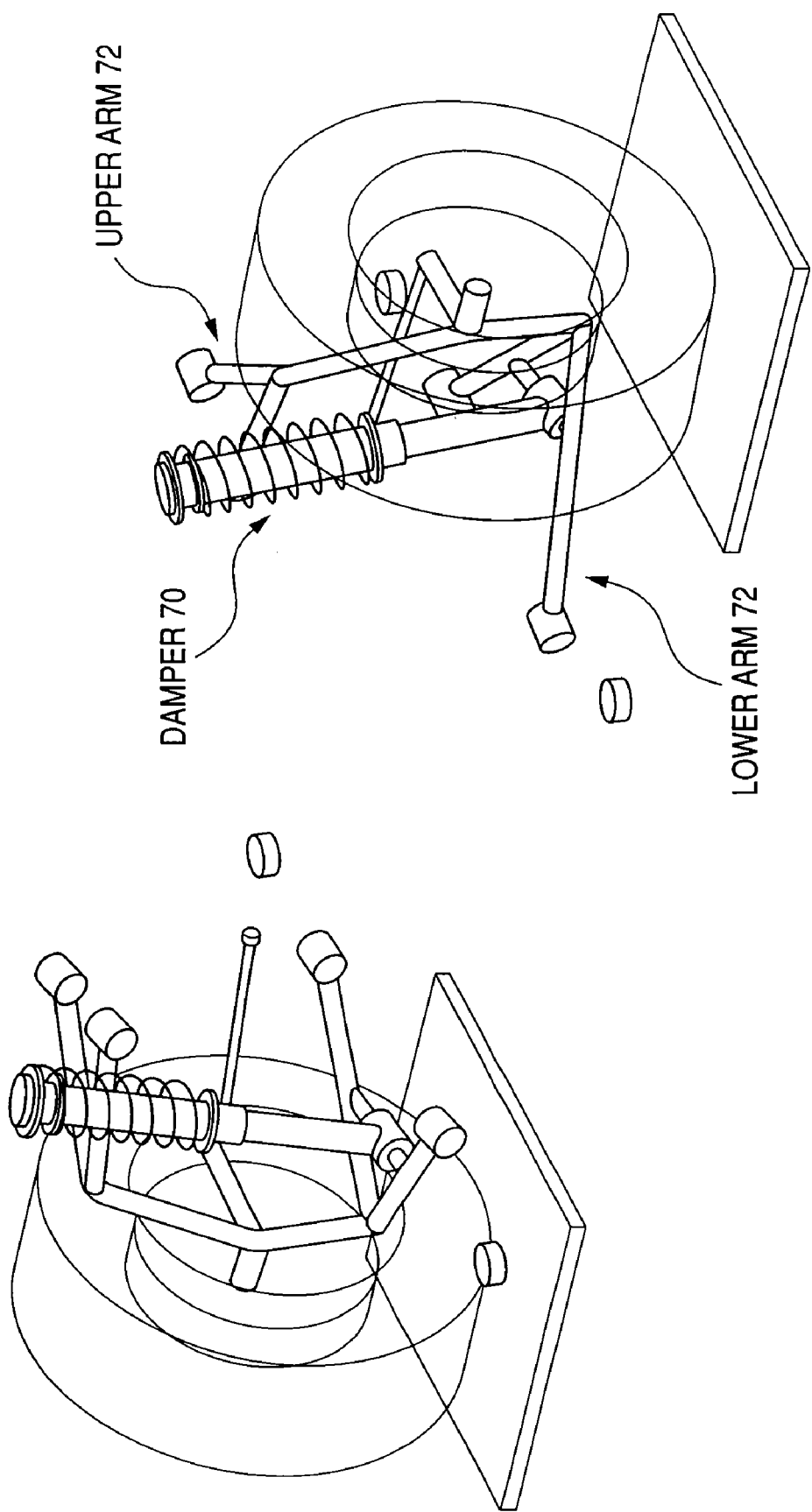
FIG. 7 is a perspective view illustrating a double wishbone suspension according to a first example of the present invention.
Figures 8, 9:
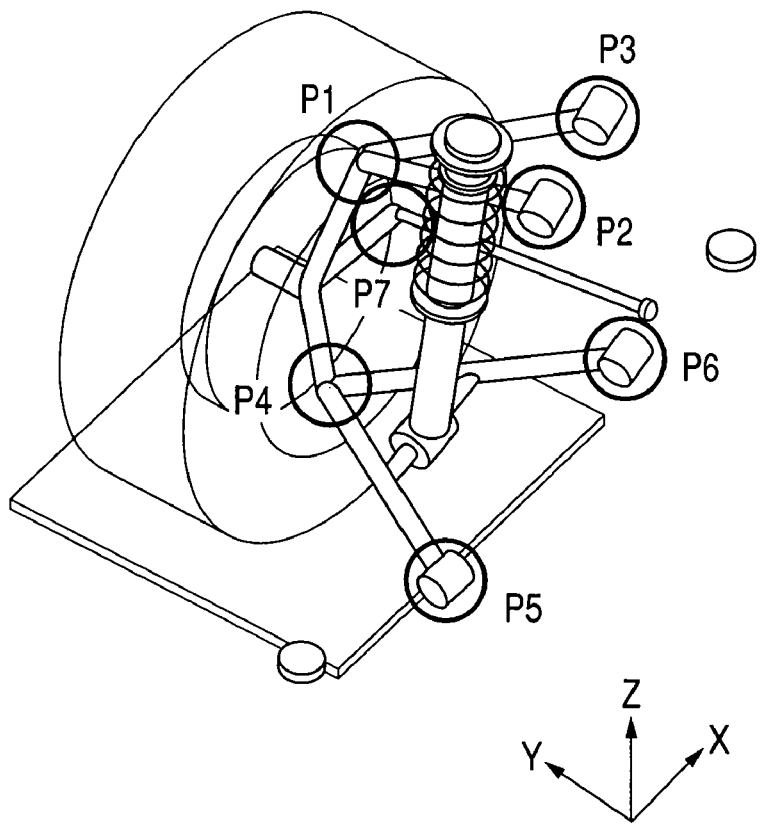
FIG. 8 is a view illustrating junctions of the double wishbone suspension according to the first example of the present invention.
FIG. 9 is a diagram illustrating design variables, and characteristic values according to the first example of the present invention.

Successively, an example of the application of the first analysis method according to the present embodiment is described. The present analysis method can be widely applied to the design of mechanical structures, and an application example to the design of a suspension of an automobile is shown. In the present example, each link coordinate (element) of an arm constituting a double wishbone suspension was noticed, and an examination was given to the influence of these elements to a camber angle and a toe angle. FIG. 7 is a conceptual diagram of the double wishbone suspension. As shown in the drawing, the double wishbone suspension is configured to include a damper 70, an upper arm 71 and a lower arm 72, each of the arms 71 and 72 nearly forming a letter A. As shown in FIG. 8, the upper arm 71 includes junctions P1, P2 and P3, the junction P1 is joined on the side of a king pin with a ball joint. Moreover, the junctions P2 and P3 are joined on the side of a chassis, and the upper arm 71 is configured so as to be swingable around the axis connecting the junction P2 with the junction P3. Similarly, also the lower arm 72 includes junctions P4, P5 and P6, and constitutes a movable link together with the upper arm 71. Such a configuration can realizes only up-and-down movements of the tire even if forces into the directions from front to back and from side to side are applied to the tire to enable the obtainment of a stable cornering performance.

Figure 10A:
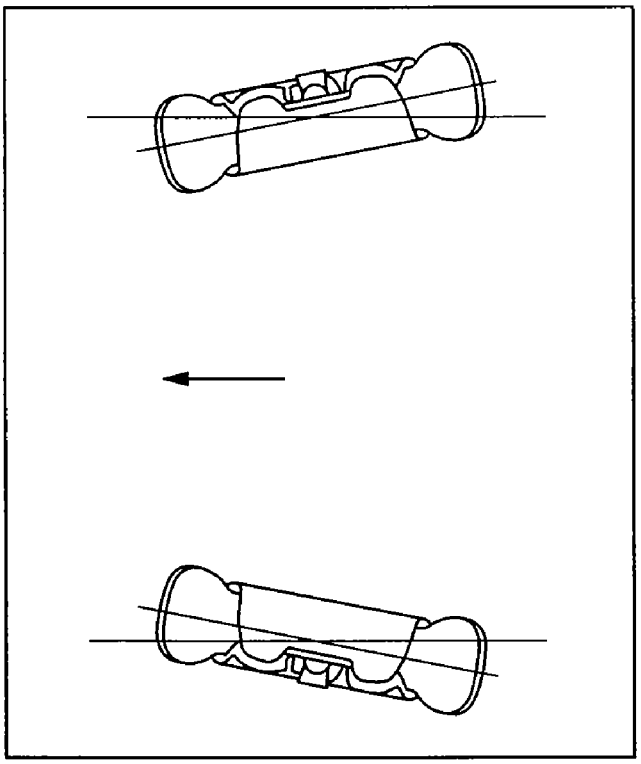
FIGS. 10A and 10B are vies for illustrating a camber angle and toe angles according to the first example of the present invention.
Figure 10B:
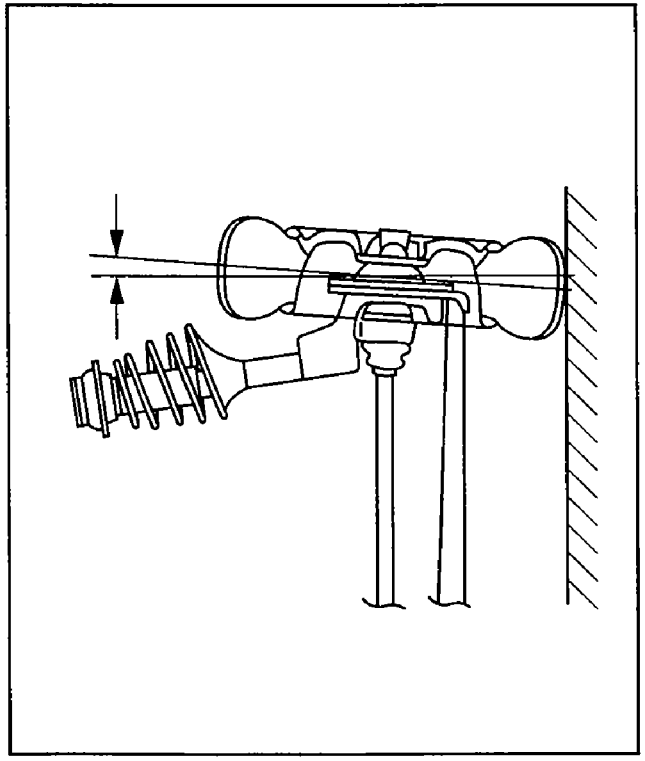

In the double wishbone suspension configured in this manner, the tire is attached to the suspension with a predetermined inclination (camber angle) to a tread in order to improve the grounding property of the tire and the turning characteristic thereof (see FIG. 10A). Moreover, toe angles are formed so as to form an inverted unfolded fan to the straight-ahead direction of an automobile in order to improve the straight-ahead stability and the agility of the automobile (see FIG. 10B).

These camber angle and toe angles are generally exert great influence of the traveling performance of an automobile, and the camber angle and the toe angles greatly change according to the attached positions of the upper arm 71 and the lower arm 72, namely the positions of the junctions P1 to P7 in the three-dimensional coordinates. Consequently, it is very important to grasp the relations between the three-dimensional coordinate values of the junctions P1 to P7, which are design variables, and the camber angle and the toe angles, which are characteristic values, in a design of a double wishbone suspension. However, the structure of the double wishbone suspension is complicated, and it is not always easy to grasp these relations. That is, which design variables should be changed in what way among many design variables must be judged in order to realize desired characteristics of the camber angle and the toe angles. However, because a calculation amount becomes enormous in case of having many design variables in the prior art simulation system, it was difficult to find out the design variables exerting great influence on the changes of the camber angle and the toe angles.

Accordingly, adopting the analysis system according to the present embodiment enables the extraction of a design principle existing between the coordinate values of the junctions P1 to P7, which are design variables, and the characteristic values, i.e. fundamental causal relations, to easily grasp the relations between both the coordinate values and the characteristic values.

In the following, the procedure of the present example will be described, referring to the drawings. First, a theoretical formula of a double wishbone suspension is previously input into the theoretical formula input unit 11. A theoretical formula previously prepared in a simulation system can be diverted to the theoretical formula of the double wishbone suspension. The theoretical formula includes design variables P$1x$, P$1y$, P$1z$ ... P$7x$, P$7y$, P$7z$ composed of three-dimensional coordinate values of each of the junctions P1 to P7 which variables are defined as mentioned above, and includes 21 design variables in total. Moreover, the characteristic values of the theoretical formula are the camber angle and the toe angles. Moreover, the stroke quantity of the damper 70 is determined so that the range of Bump-Rebound may be ±90 mm.

Successively, the model creation unit 12 determines each of the design variables P$1x$, P$1y$, P$1z$ ... P$7x$, P$7y$, P$7z$ using an orthogonal table. In the present example, the number of the design variables is 21 in total, and 128 models are created using the orthogonal table having four levels. Moreover, a plurality of orthogonal tables may be derived by rotating one orthogonal table as mentioned above to create the models. Moreover, it becomes possible to create a plurality of models that are equal and do not duplicate with one another by rotating the orthogonal table.

The simulation unit 10 calculates the camber angles and the toe angles as the characteristic values with regard to each of the 128 models determined in this way. That is, the camber angles and the toe angles to the design variables P$1x$, P$1y$, P$1z$ ... P$7x$, P$7y$, P$7z$ determined by the orthogonal table are calculated, and these values are preserved into the memory map 16 as a data set. The simulation is repeated to all of the 128 models in this way.

The characteristics of the camber angles and the toe angles change according to the models, and some models among the 128 models have similar characteristics to each other. The clustering unit 14 obtains the distances between the curved lines expressing the changes of the camber angles and the toe angles with regard to each of the 128 models, and classifies the models having the minimum distances into one cluster. That is, the models having similar characteristics of the camber angles and the toe angles are classified into one cluster.

Figure 14:
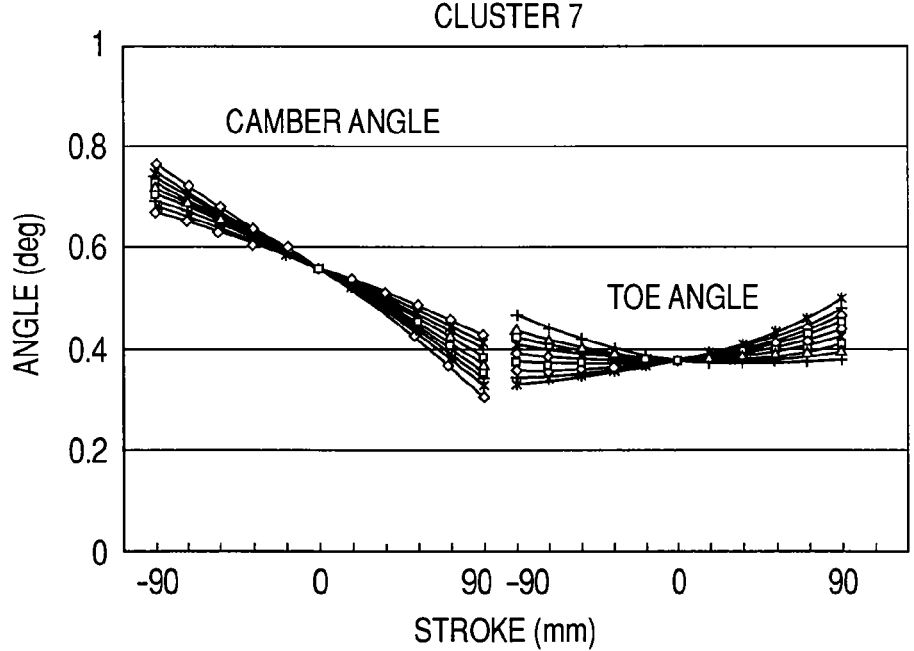
FIG. 14 a graph illustrating the camber angles and the toe angles of a cluster 7 according to the first example of the present invention.

FIGS. 12 to 14 show examples of the characteristic graphs of the camber angles and the toe angles that are classified into clusters. In these graphs, the abscissa axes indicate stroke quantities (mm) of the damper 70, and the ordinate axes indicate angles (deg). Moreover, a plurality of characteristic curved lines drawn in each graph indicates that a plurality of models was classified in the same clusters. As it is possible to confirm from these drawings, it is known that the models having the characteristics of the camber angles and the toe angles similar to each other were classified into the same clusters. The clusters 1, 6 and 7 include the aforesaid models as shown in FIGS. 12 to 14.

As mentioned above, it is possible to perform the classification of the models using the design variables having strong connections with characteristic values as a benchmark by performing the clustering of the models having the characteristics similar to one another. That is, the values of the design variables exerting the little influence on the characteristic values are uniformly distributed in each cluster, and the design variables having high sensitivity show a peculiar value to each cluster. The design variables exerting great influence on the camber angles and the toe angles can be extracted in this way. That is, it becomes possible to seek the coordinates of the junctions having correlations with the changes of the camber angles and the toe angles.

Figure 11:
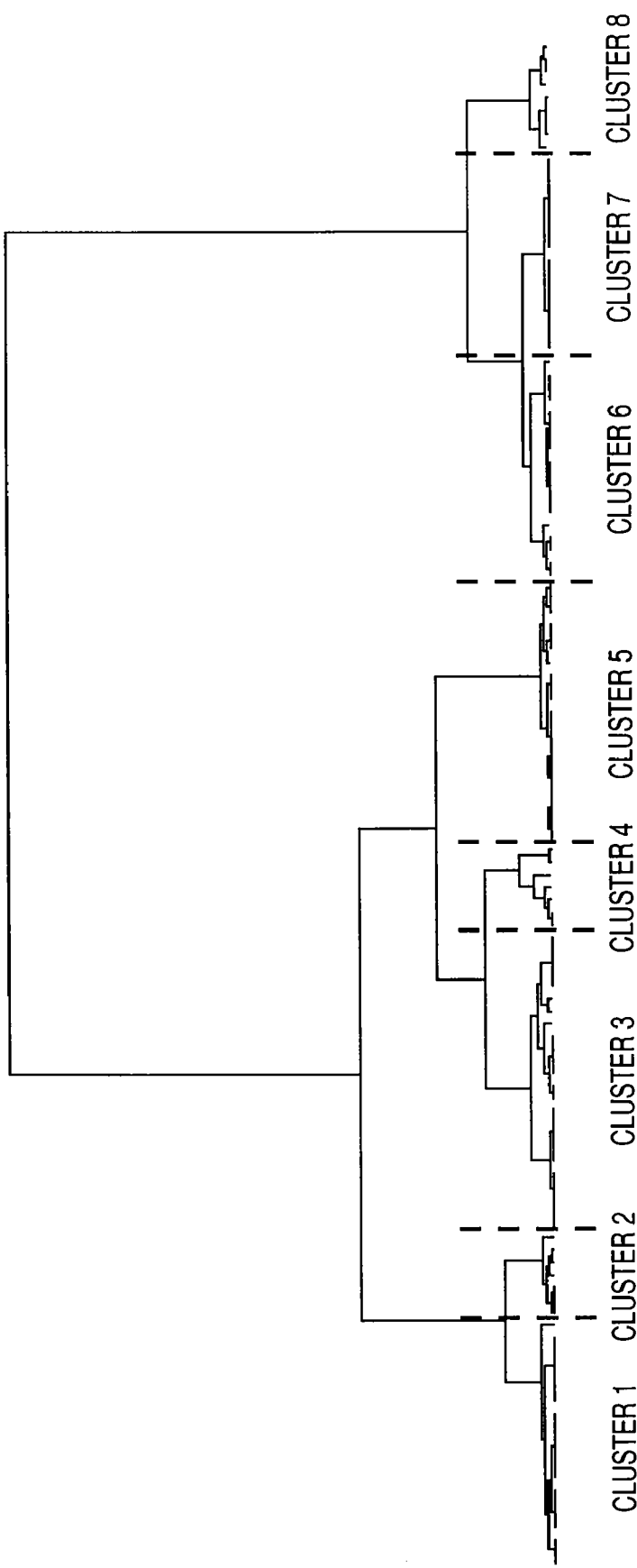
FIG. 11 is a view illustrating hierarchical clustering according to the first example of the present invention.

FIG. 11 shows a result of the hierarchical clustering according to the present example. Each of the 128 models is classified into a higher rank cluster in order by the clustering unit 14. If the execution of the hierarchical clustering is continued, all of the 128 models are classified into one cluster, and a hierarchized tree diagram shown in the drawing is created. In the present example, models were analyzed using the hierarchy including eight clusters 1 to 8. 16 models in total are included in each cluster, and the classification using the design variables having high sensitivity to the characteristics of the camber angles and the toe angles as the benchmarks is made.

In the created clusters, the correlation coefficient calculation unit 13 calculates the correlation coefficients of each of the design variables P$1x$, P$1y$, P$1z$ ... P$7x$, P$7y$, P$7z$. That is, the correlation coefficient calculation unit 13 calculates the changes of the design variables P$1x$, P$1y$, P$1z$ ... P$7x$, P$7y$, P$7z$ in the case where the damper 70 is changed in a certain range, and obtains the strength of the correlations of the changes among design variables.

Figure 15:
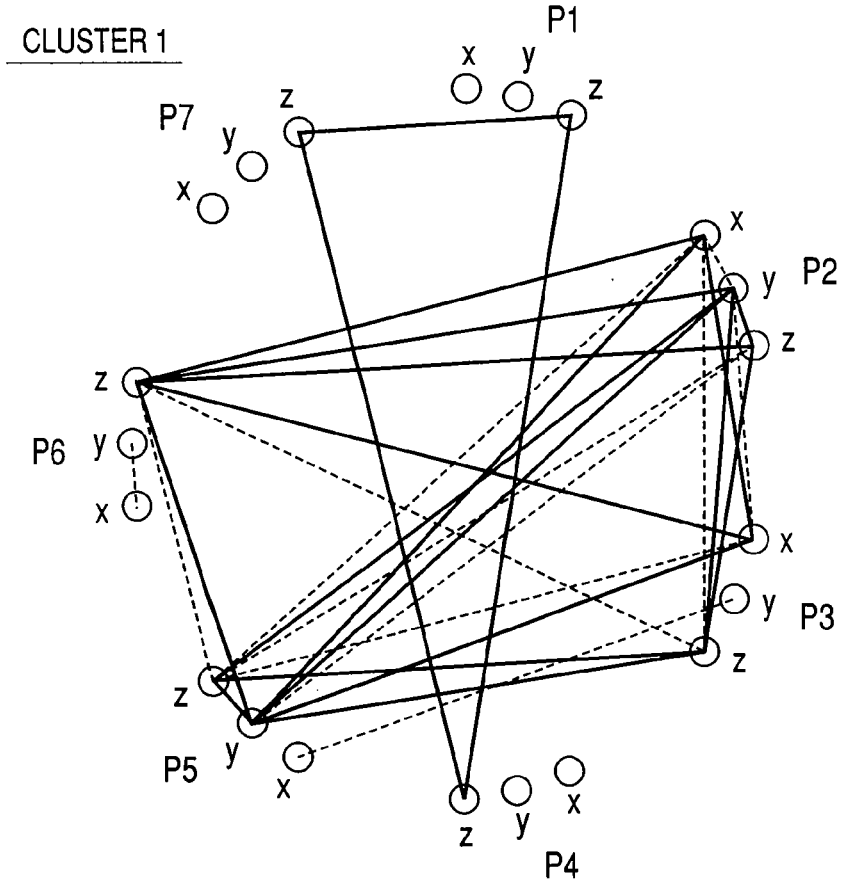
FIG. 15 is a diagram illustrating mutual correlations between design variables in the cluster 1 according to the first example of the present invention.
Figure 16:
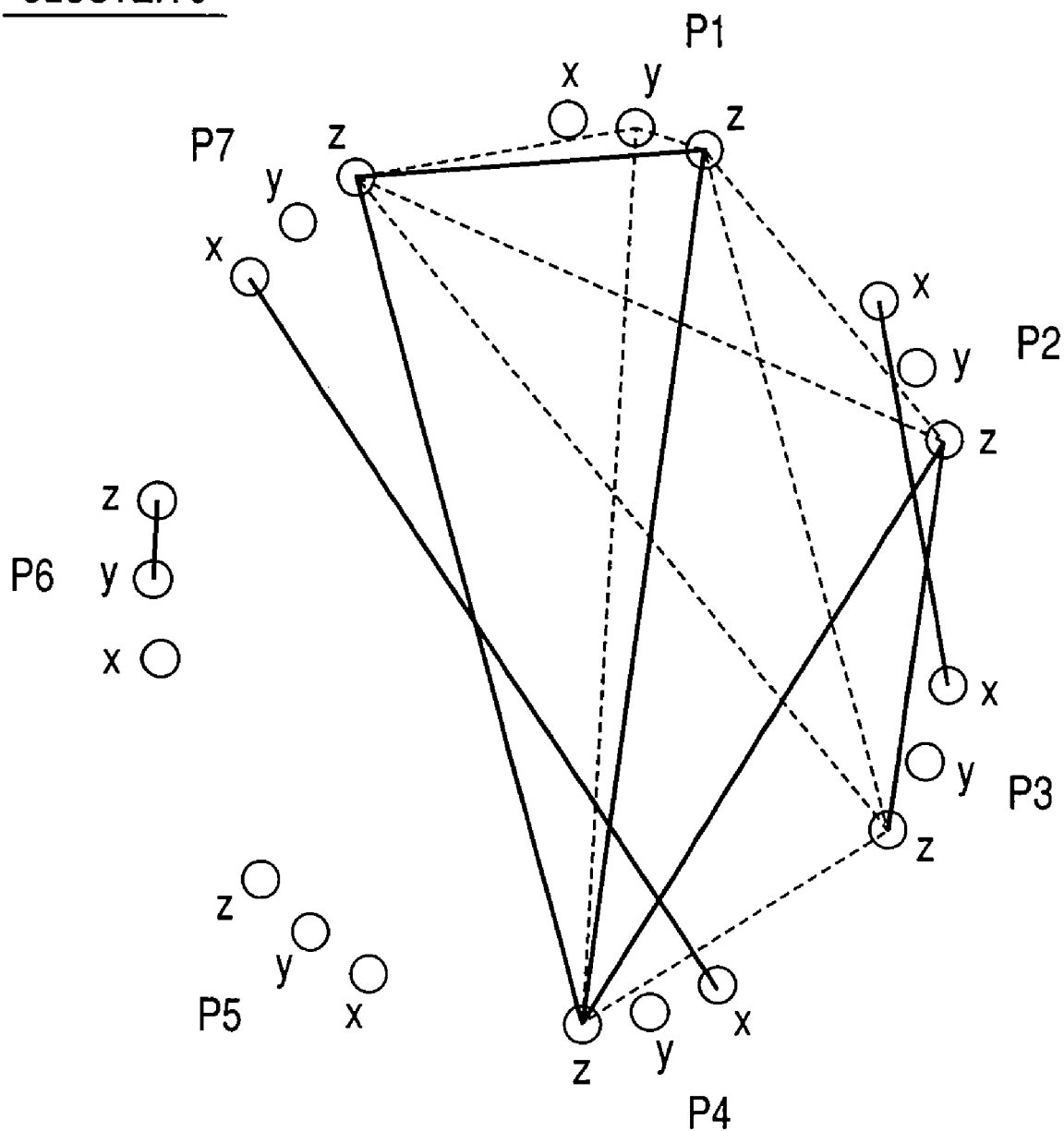
FIG. 16 is a diagram illustrating mutual correlations between design variables in the cluster 6 according to the first example of the present invention.
Figure 17:
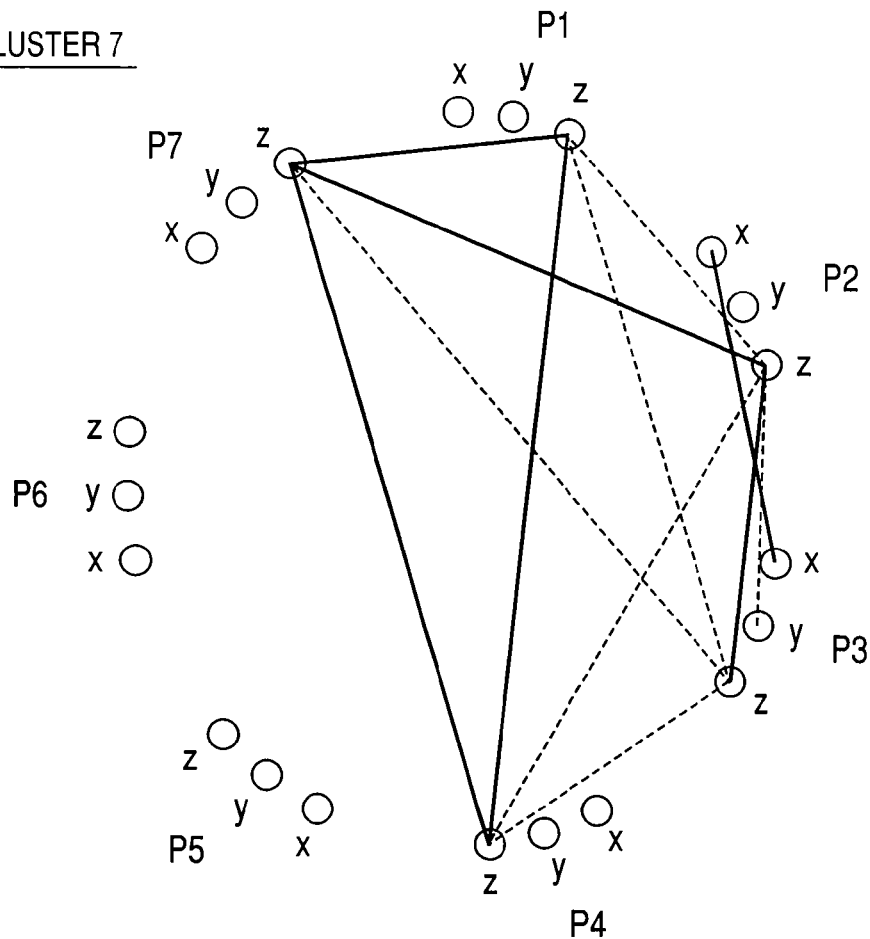
FIG. 17 is a diagram illustrating mutual correlations between design variables in the cluster 7 according to the first example of the present invention.

Examples of calculation results of the correlation coefficients in each of the clusters 1, 6 and 7 are shown in FIGS. 15 to 17. In the drawings, solid lines indicate that the correlation coefficients are 0.95 to 1.00, and broken lines indicate that the correlation coefficients are 0.90 to 0.95. Moreover, the drawings show that the design variables that are not connected with any other design variables with solid lines or broken lines have the correlation coefficients below those values. The thus created diagrams are preserved in the database 17, and the diagrams can be used for later design.

Figure 19:
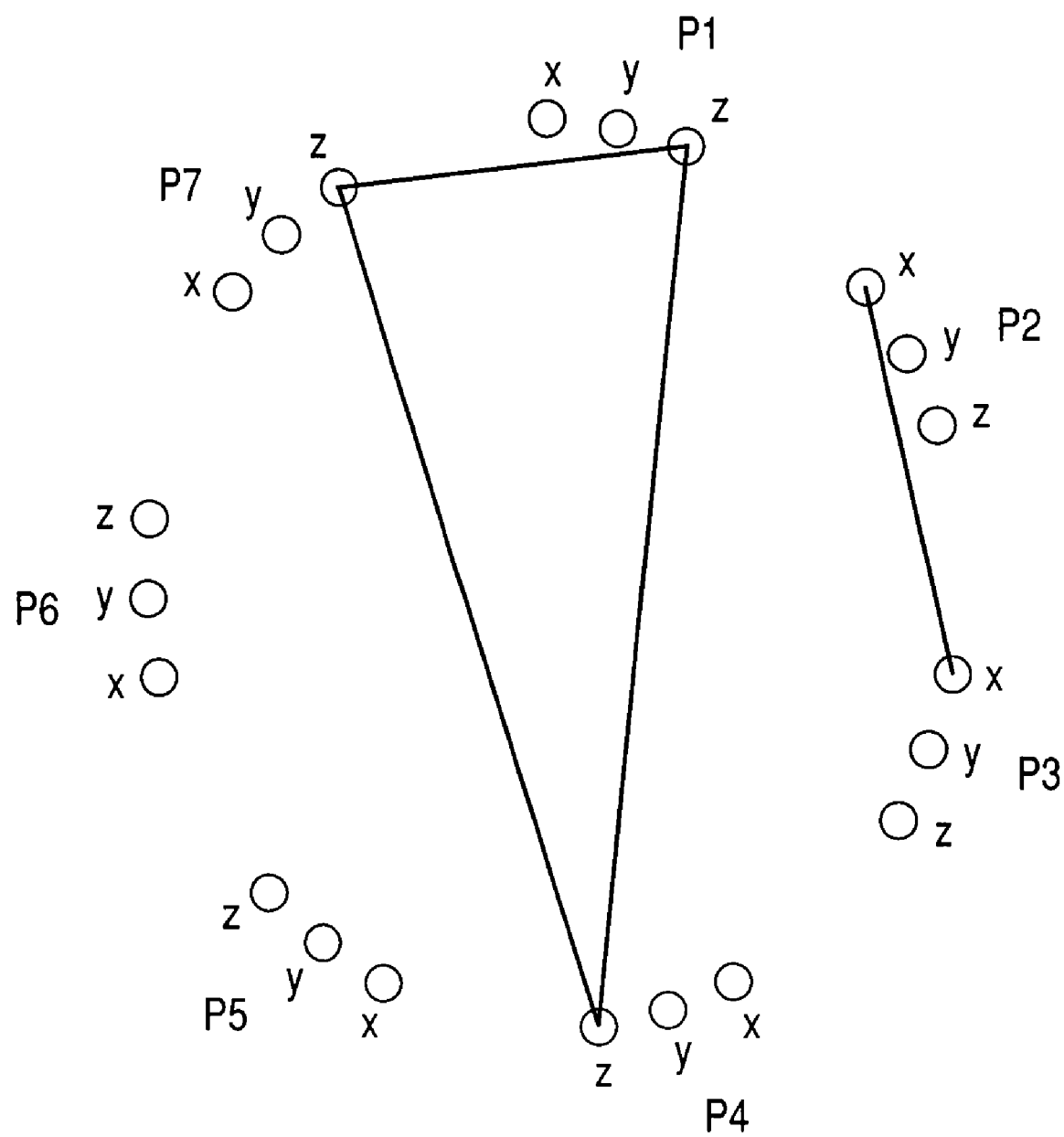
FIG. 19 is a diagram illustrating an average value of correlation coefficients according to the first example of the present invention.

Successively, the principle extraction unit 15 calculates the average of the correlation coefficients of the design variables P1x, P1y, P1z ... P7x, P7y, P7z of each cluster, and creates the graph shown in FIG. 19. In the drawing, the solid lines indicate that the average value of the correlation coefficients is 0.95 to 1.00. As apparent from the drawing, it is known that the combination of the design variables P1z, P4z and P7z and the combination of the design variables P2x and P3x have high correlation coefficients.

Figure 18:
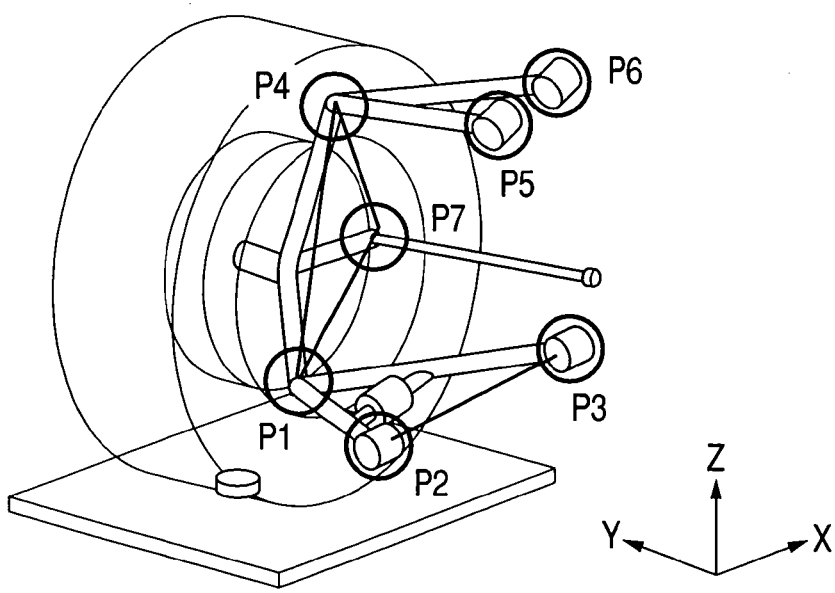
FIG. 18 is a diagram illustrating the junctions having strong correlations in the double wishbone suspension according to the first example of the present invention.

The design variables P1z, P4z and P7z mentioned above indicate the displacement of the junctions P1, P4 and P7 into the Z-axis direction as shown in FIG. 18. For this reason, it can be confirmed that the displacement of the junctions P1, P4 and P7 into the Z-axis direction greatly exerts the influence on the changes of the camber angles and the toe angles. That is, it is known that the camber angles and the toe angles change with the displacement of the junctions P1, P4 and P7 into the Z-axis direction owing to the displacement of the damper 70.

By the processing mentioned above, it can be grasped that the correlations between the displacement of the three points of the junctions P1, P4 and P7 into the Z-axis direction and the camber angles and the toe angles are important in the design of the double wishbone suspension. Consequently, in the design of the double wishbone suspension, desired camber angles and toe angles can be realized by suitably altering the coordinates of the junctions P1, P4 and P7. That is, because the design variables exerting great influence on the characteristic values of the camber angles and the toe angles can be extracted even if the number of the design variables is large like that of the double wishbone suspension, efficient design can be performed.

Figure 20A:
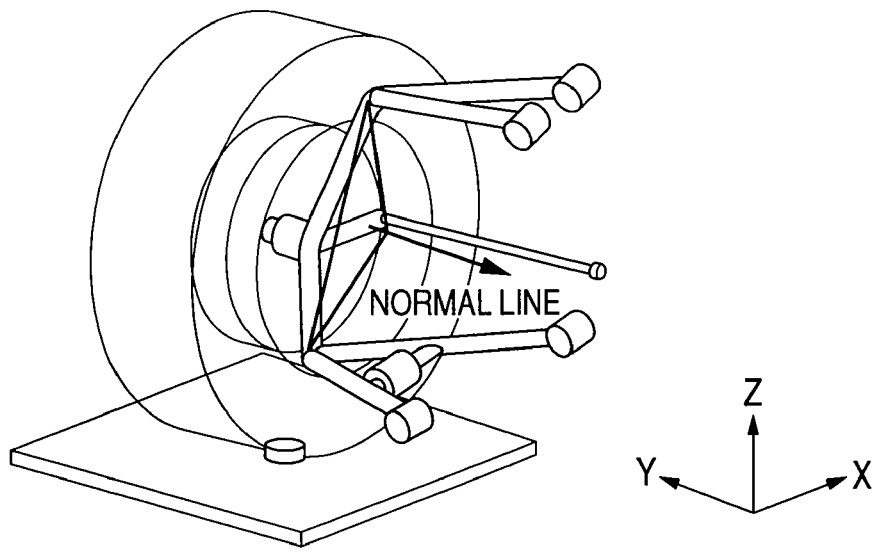
FIGS. 20A, 20B and 20C are views for illustrating a design principle of the double wishbone suspension according to the first example of the present invention.

The result mentioned above can be also verified by the following matter. As shown in FIG. 20A, a normal line of a surface constructed of the junctions P1, P4 and P7 is examined. The changes of the normal line shown in FIG. 20B indicate the changes of a camber angle, and the changes of the normal line in FIG. 20C indicate the changes of a toe angle. Hereupon, FIG. 20B is a view in which the suspension is observed from the X-axis direction (the traveling direction of the vehicle), and FIG. 20C is a view in which the suspension is observed from the Z-axis direction (the upper part of the vehicle).

Figure 20B:
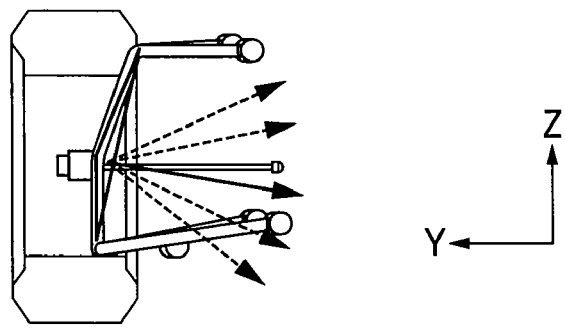
Figure 20C:
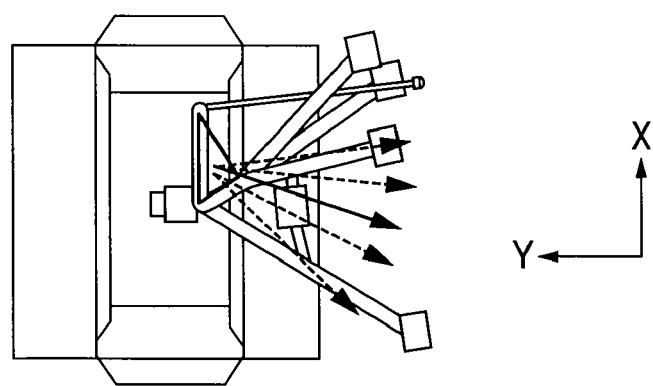

As shown in FIG. 20B, it can be confirmed that the normal line changes as the arrows with the vertical motions of the damper 70, and that the surface formed of the junctions P1, P4 and P7 is displaced to change the camber angle. Moreover, as shown in FIG. 20C, it can be confirmed that the surface formed of the junctions P1, P4 and P7 is displaced with the vertical motions of the damper 70, and that the toe angle changes.

Figure 21:
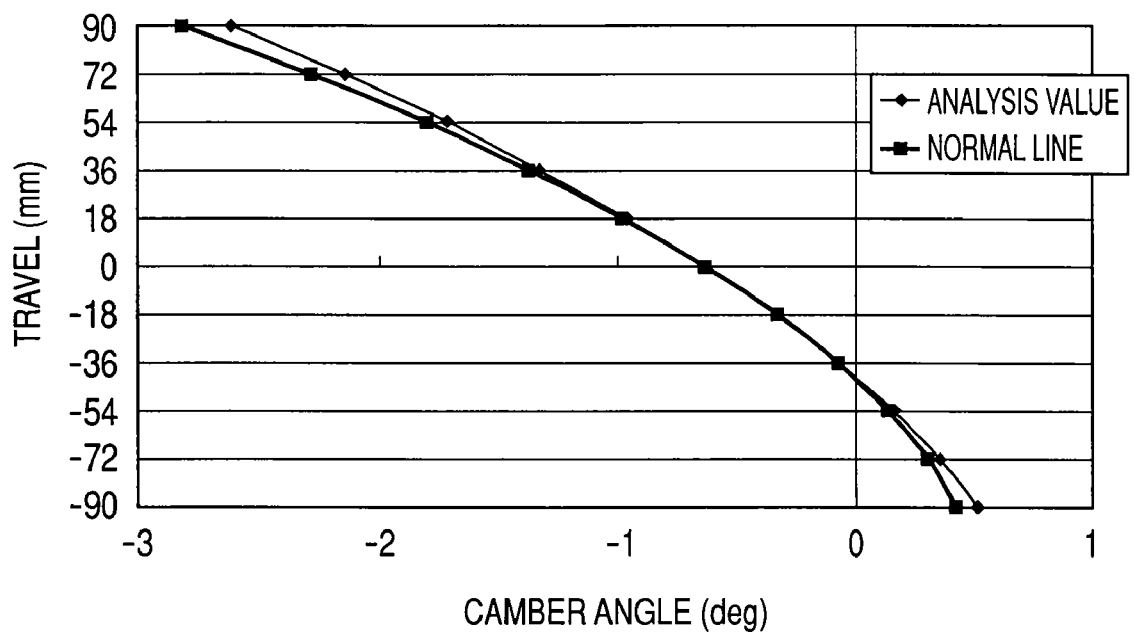
FIG. 21 is a graph illustrating comparison between analysis results and actual measurement values with regard to the characteristic of camber angles according to the first example of the present invention.
Figure 22:
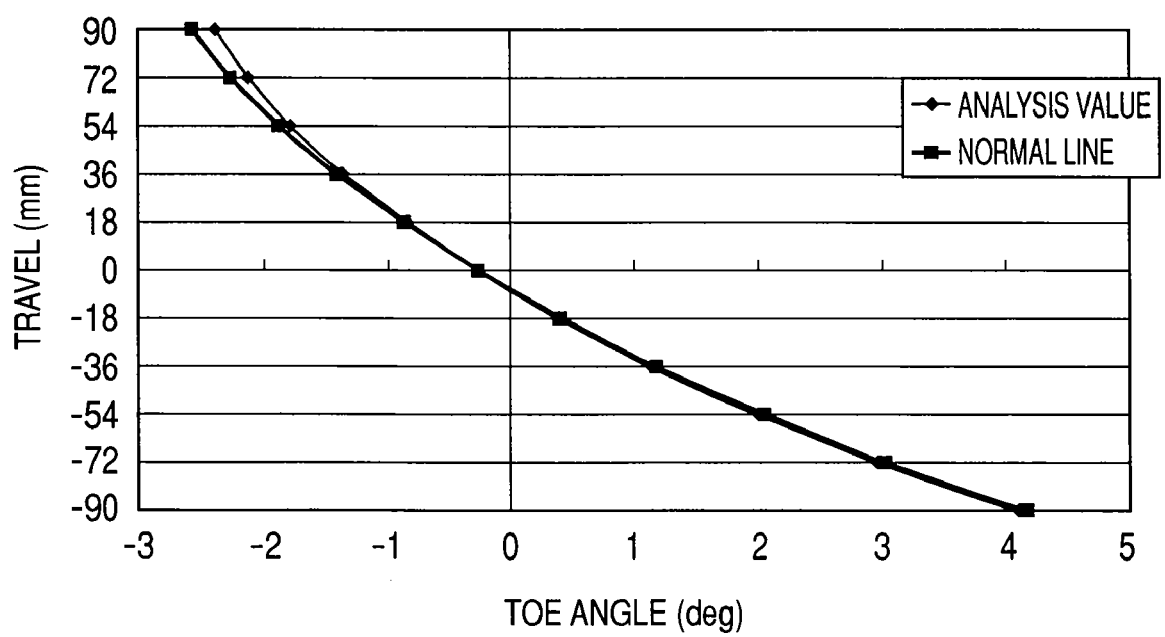
FIG. 22 is a graph illustrating comparison between analysis results and actual measurement values with regard to the characteristic of toe angles according to the first example of the present invention.

FIG. 21 shows a relation between the camber angles and the displacement of the damper 70. In the drawing, the curved line shown by the black circles expresses the changes of the camber angles based on analysis results, and the curved line shown by black quadrilaterals expresses the changes of the camber angles that have been calculated by the inclinations of the normal line mentioned above. As it can be confirmed from the graph, the results of both the lines agree with each other, and it can be confirmed that the analysis results of the present example are correct. Similarly, as shown in FIG. 22, also with regard to the toe angles, it was known that the analysis result in the present example was correct, and the effectiveness of the analysis method in the present embodiment was verified.

EXAMPLE 2

Figure 23:
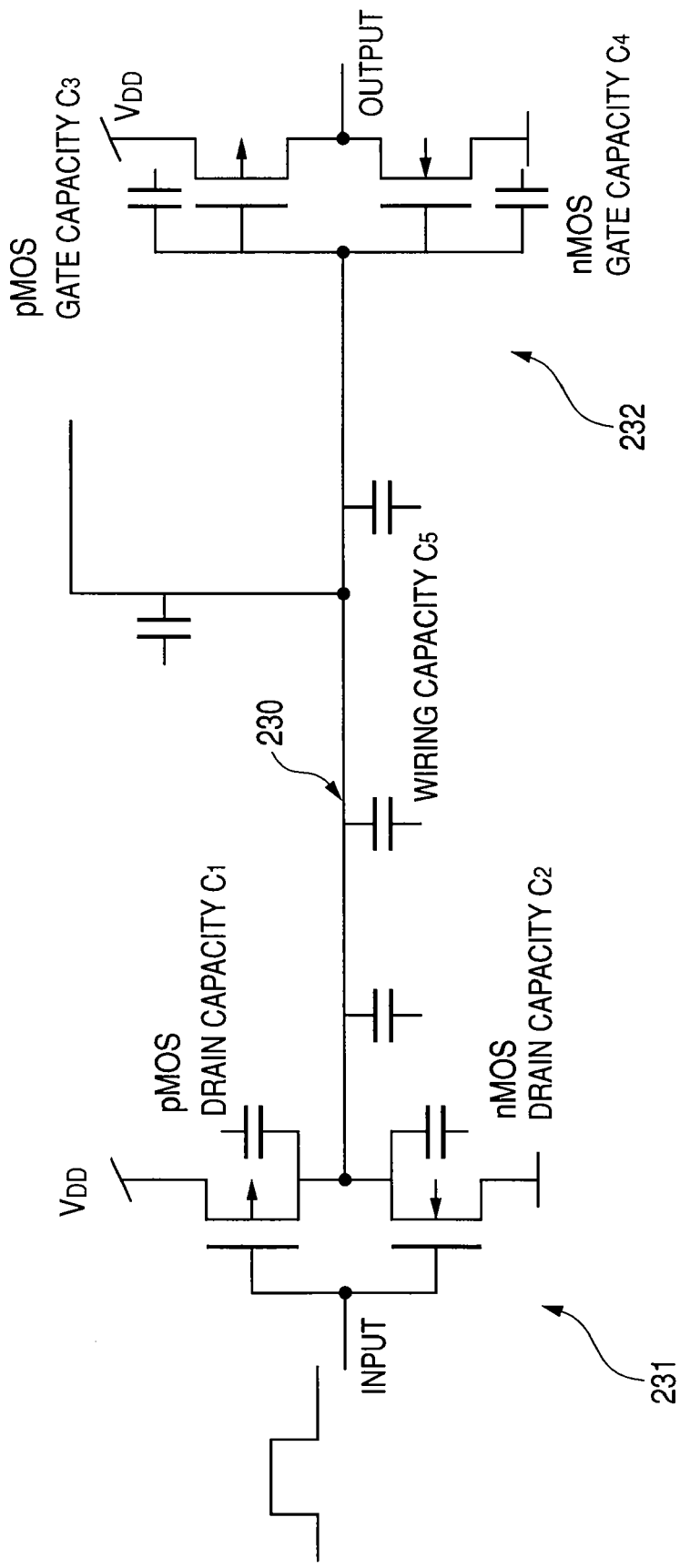
FIG. 23 is a diagram illustrating an application example of the present invention to a semiconductor integrated circuit according to a second example.

Successively, an example of the application of the first analysis method according to the present embodiment to circuit design will be described. FIG. 23 shows an example of a semiconductor integrated circuit using CMOS transistors. The circuit is configured to include two inverter circuits 231 and 232, and a wiring pattern 230 connecting these inverter circuits 321 and 232. Each of the CMOS transistors and the wiring pattern includes parasitic capacitance, and it is known that the switching characteristics of the inverter circuits are deteriorated owing to the parasitic capacitance. A CMOS transistor includes gate capacity C3 and C4 at gate electrodes, and drain capacity C1 and C2 at drain electrodes. The magnitude of the gate capacity C3 and C4 and the drain capacity C1 and C2 are determined according to the structures of the gate electrodes, and the drain electrodes. Moreover, wiring capacity C5 is determined according to the distance of the wiring pattern 230 from other patterns.

Figure 24:
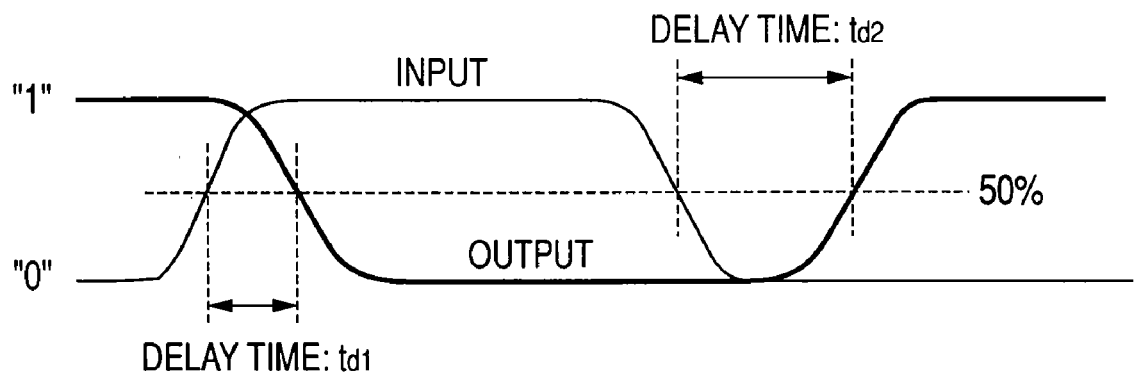
FIG. 24 is a graph for illustrating delay times of an inverter circuit according to a second example of the present invention.

The output waveform corresponding to an input waveform changes according to the magnitude of the parasitic capacitance C1 to C5. For example, a delay time of the output waveform is produced to the input waveform, as shown in FIG. 24. That is, there are a delay time td1 of the output waveform to the rise of the input waveform and a delay time td2 of the fall to the input waveform.

Although it is desirable to reduce the parasitic capacitance C1 to C5 mentioned above in order to reduce the delay time td1 and td2, it is frequently difficult to reduce all of the parasitic capacitance C1 to C5 owing to the limitation of design. Moreover, the value of the parasitic capacitance greatly changes according to the structure of the gate length and the drain length of a CMOS transistor constituting the inverter circuits 231 and 232. The strength of the influence exerted on the delay time td1 and td2 greatly changes according to these factors, and it is not easy to grasp how to determine each factor of a semiconductor circuit. Accordingly, it becomes possible to efficiently reduce the delay time td1 and td2 by extracting a design principle inherent between the circuit structure and the delay time td1 and td2 to perform design using the analysis system according to the present invention.

Figure 25:
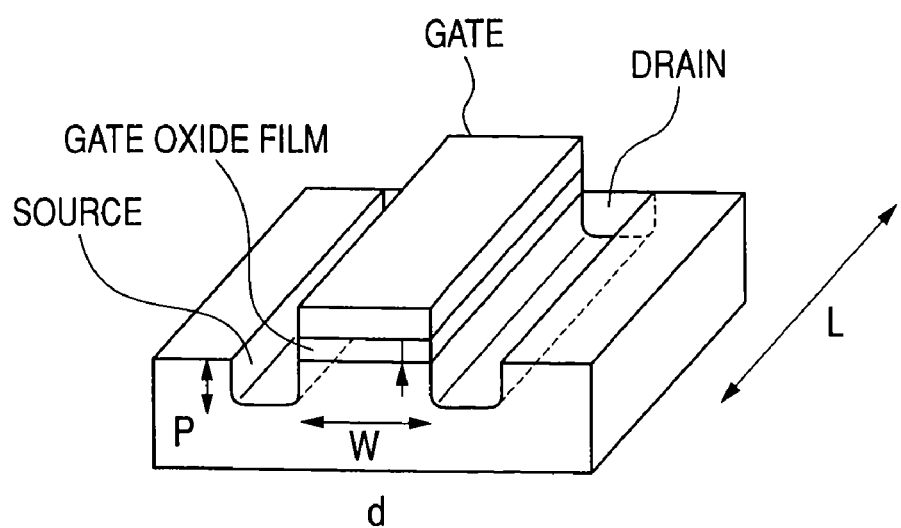
FIG. 25 is a configuration diagram of a MOS transistor according to the second example of the present invention.

As shown in FIG. 25, the gate length L, the gate width W, the gate oxide film thickness d and the drain thickness P of a CMOS transistor is defined as the design variables of the CMOS transistor. Furthermore, the pattern length L1 and the inter-wire distance L2 of the wiring pattern 230 are defined as the design variables. The delay time td1 and td2 are determined as the characteristic values, and a theoretical formula between those is determined to be input into the theoretical formula input unit 11.

The model creation unit 12 creates a plurality of models by determining each value of the design variables of the gate length L, the gate width W, the gate oxide film thickness d, the drain thickness P, the pattern length L1 and the distance between wires L2 using an orthogonal table. As described above, it is possible to create the models each having no mutual duplication and being equal by using the orthogonal table. The simulation unit 10 performs the simulations of these models to calculate the delay time td1 and td2 of each model. The thus calculated delay time td1 and td2 show different changes according to the values of the design variables.

Successively, the clustering unit 14 classifies the models having similar changes of the delay time td1 and td2 into the same clusters to perform hierarchical clustering. Each cluster was classified to each value of the design variables exerting great influence on the delay time td1 and td2, and it is possible to grasp the design variables exerting the great influence on the delay time td1 and td2 based on these clusters. It can be confirmed that the design variables of the gate length L, the gate width W, the pattern length L1 and the distance between wires L2 exert comparatively strong influence on the delay time td1 and td2 in the present example.

The correlation coefficient calculation unit 15 calculates the correlation coefficients between the design variables in the clusters obtained by the aforesaid processing. That is, the correlation coefficient calculation unit 15 obtains the changes of the design variables in the case where the characteristic values are changed within a certain range, and calculates the correlation coefficients among the design variables at this time. For example, if the gate capacities C3 and C4 are changed, the correlation coefficient between the gate length L and the gate width W becomes high. Moreover, if the wiring capacity C5 is changed, the correlation coefficient between the pattern length L1 and the distance between wires L2 becomes high. That is, the design variables having high correlation coefficients exert the influence on the delay time td1 and td2 in conjunction with each other.

The principle extraction unit 15 calculates the average values of correlation coefficient in a plurality of clusters to find out the design variables having the correlation coefficient having high average values. In the present example, the correlation coefficient between the gate length L and the gate width W and the correlation coefficient between the pattern length L1 and the distance between wires L2 also showed high values. From the result, the gate capacity C3 and C4 is determined by the gate length L and the gate width W, and furthermore these values exert influence on the delay time td1 and td2. Moreover, the wiring capacity C5 is determined by the pattern length L1 and the distance between wires L2, and the value exerts influence on the delay time td1 and td2.

The design principle between the delay time td1 and td2 and the design variables can be extracted, and it becomes possible for a designer to grasp how to change the design variables in order to obtain a desired characteristic at the time of designing a semiconductor integrated circuit.

EXAMPLE 3

Moreover, the present invention can be applied to the estimation of the performance of a network line. Although it is to be desired that the line of a network has the capacity as large as possible. A line having needlessly large capacitance is not preferable in view of the cost thereof in consideration of keeping cost. In such a situation, the estimation of network performance is widely performed.

Although it is considerable to use a Ping response as the measure of the performance (service level) of a network, it is not always easy to grasp a design principle between many factors (design variables) and the Ping response. Accordingly, the system according to the present invention is applied to calculate and extract the regions necessary for network design, and thereby design time and cost can be greatly reduced. In the following, the procedure of the simulation of the performance of a network will be described.

First, traffic X1, a network configuration X2, the number of users X3, the application X4 to be used and the number of nodes X5 are supposed as the design variables of a network, and these are quantified to determine the variables X1 to X5. Moreover, it is supposed that the characteristic value of the network is the Ping response as mentioned above.

First, the model creation unit 11 determines the initial values of the variables X1 to X5 using an orthogonal table, and the simulation calculation unit 10 calculates the Ping responses of the network models having the variables. Incidentally, the existing estimation system can be used as it is for the simulations of the network models. The clustering unit 14 classifies the network models having the Ping responses having mutually similar characteristics to the same clusters. Furthermore, the clustering unit 14 classifies these clusters to perform hierarchical clustering.

The correlation coefficient calculation unit 13 calculates the design variables in conjunction with one another by calculating the correlation coefficients of the design variables. For example, if the number of users increases, the number of applications to be used is also in the tendency of increasing, and a strong correlation exists between the number of users X3 and the application X4 to be used. Moreover, a strong correlation also exists between the network configuration X1 and the number of nodes X5. Successively, the principle extraction unit 15 calculates the average value of the correlation coefficients in each cluster, and extracts the design variables having high correlation coefficients. In this manner, the design variables having strong correlations with each other can be determined, and the relations between these design variables and the characteristic values, or the Ping responses, can be grasped. That is, according to the present example, it becomes possible to extract the design principle between various design variables and the characteristic values, the Ping responses, of a network model.

EXAMPLE 4

Figure 30:
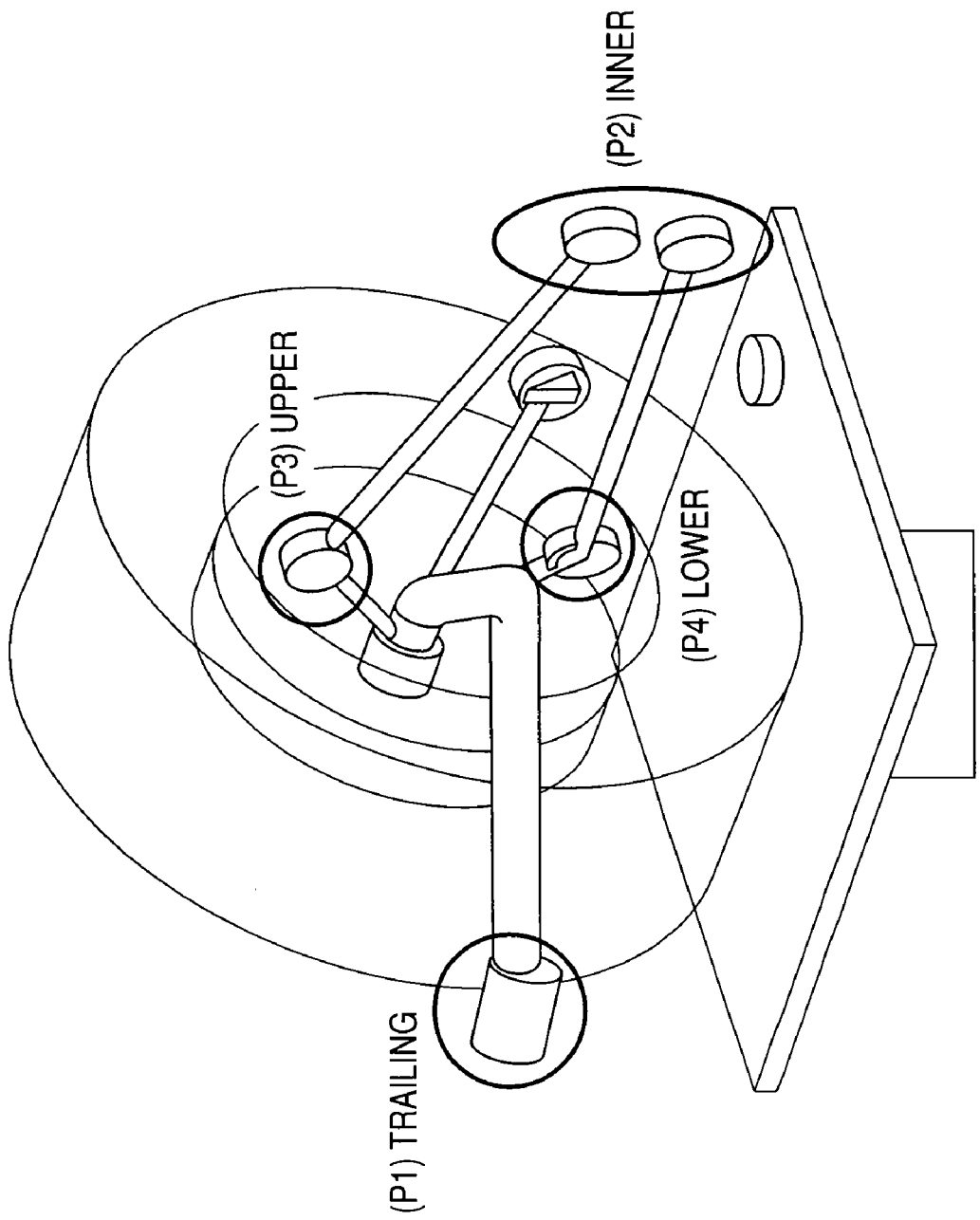
FIG. 30 is a view illustrating a model of a multi-link suspension according to a fourth example of the present invention.
Figure 31:
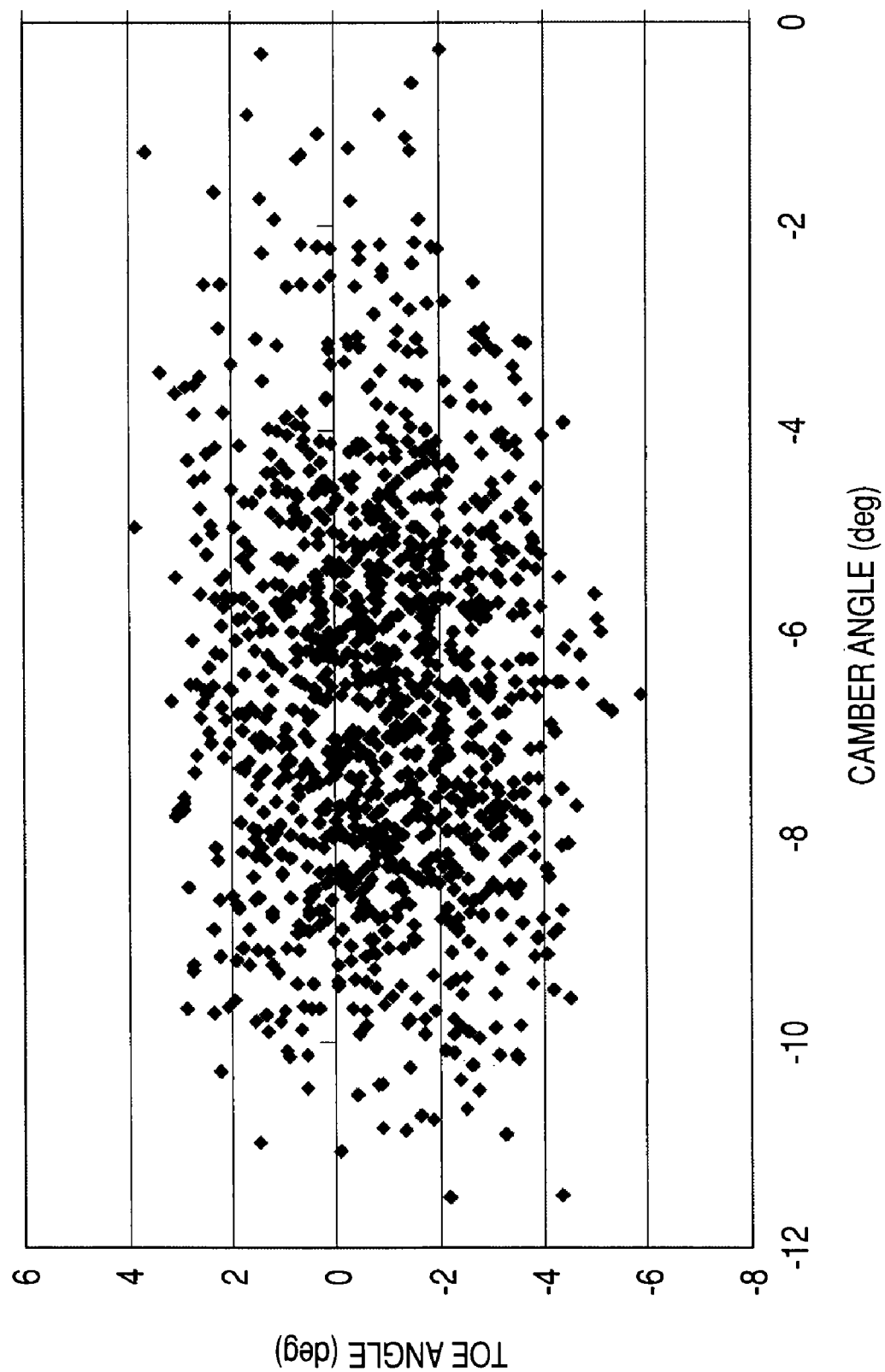
FIG. 31 is a graph illustrating a distribution of design variables according to the fourth example of the present invention.

Successively, an example of applying the second analysis method according to the present embodiment to a multi-link suspension will be described. FIG. 30 shows a model of the multi-link suspension, and the multi-link suspension is configured to include a trailing arm, an inner arm, an upper arm, and a lower. And, it is supposed that the following analysis is performed using the junctions P1, P2, P3 and P4 of each arm as design variables.

A tire is attached to the multi-link suspension with a predetermined inclination (camber angle) to the tread thereof in order to improve the grounding property and turning characteristics of the tire in the multi-link suspension. Moreover, toe angles are formed so as to form an invert unclosed fan to the straight-ahead direction of an automobile in order to improve the straight-ahead stability and the agility of the automobile.

These camber angle and toe angles exert great influence on the traveling performance of the automobile, and the camber angle and the toe angles greatly change at some positions in the three-dimensional coordinates of the junctions P1 to P4. Consequently, it is very important to grasp the relations between the three-dimensional coordinate values of the junctions P1 to P4, which are design variables, and the camber angle and the toe angles, which are characteristic values, in the design of the multi-link suspension. By using the analysis method according to the present embodiment, it becomes possible to extract the design principle existing between the coordinate values of the junctions P1 to P4, which are the design variables, and the camber angle and the toe angles, and to easily grasp the relations between them.

In the following, the procedure of the present example will be described, referring to the drawings. First, a theoretical formula of a multi-link suspension is previously input into the theoretical formula input unit 11. A theoretical formula previously prepared in a simulation system can be diverted to the theoretical formula of the multi-link suspension. The theoretical formula includes design variables $P1x$, $P1y$, $P1z$ . . . $P4x$, $P4y$, $P4z$ composed of three-dimensional coordinate values of each of the junctions P1 to P4 which variables are defined as mentioned above, and includes 12 design variables in total. Moreover, the characteristic values of the theoretical formula are the camber angle and the toe angles.

Successively, the model creation unit 12 determines the concrete numeral value of each of the design variables P1$x$, P1$y$, P1$z$ ... P4$x$, P4$y$, P4$z$ using an orthogonal table. In the present example, the number of the design variables is 12 in total, and 128 models are created using the orthogonal table having four levels. Moreover, a plurality of orthogonal tables may be derived by rotating one orthogonal table as mentioned above to create the models using these orthogonal tables.

The simulation unit 10 calculates the camber angle and the toe angles as the characteristic values with regard to each of the 128 models determined in this way. That is, the camber angles and the toe angles to the various design variables P1$x$, P1$y$, P1$z$ ... P7$x$, P7$y$, P7$z$ determined by the orthogonal table are calculated, and these numerical values are preserved into the memory map 16 as a data set. The simulation is repeated to all of the 128 models in this way. The models obtained by the simulations are distributed as shown in FIG. 29.

The characteristics of the camber angles and the toe angles change according to the models, and some models among the 128 models have similar characteristics to each other. The clustering unit 14 obtains the distances between the curved lines expressing the changes of the camber angles and the toe angles with regard to each of the 128 models, and classifies the models having the minimum distances into one cluster. That is, the models having similar characteristics of the camber angles and the toe angles are classified into one cluster.

In this manner, by performing the clustering the models having similar characteristics, it is possible to classify the models using the design variables having strong connections with characteristic values as the basis. That is, the values of the design variables exerting little influence on the characteristic values are uniformly distributed in each cluster, and the design variables having high sensitivity show a peculiar value to each cluster. The design variables exerting great influence on the camber angles and the toe angles can be extracted in this way.

Figure 32:
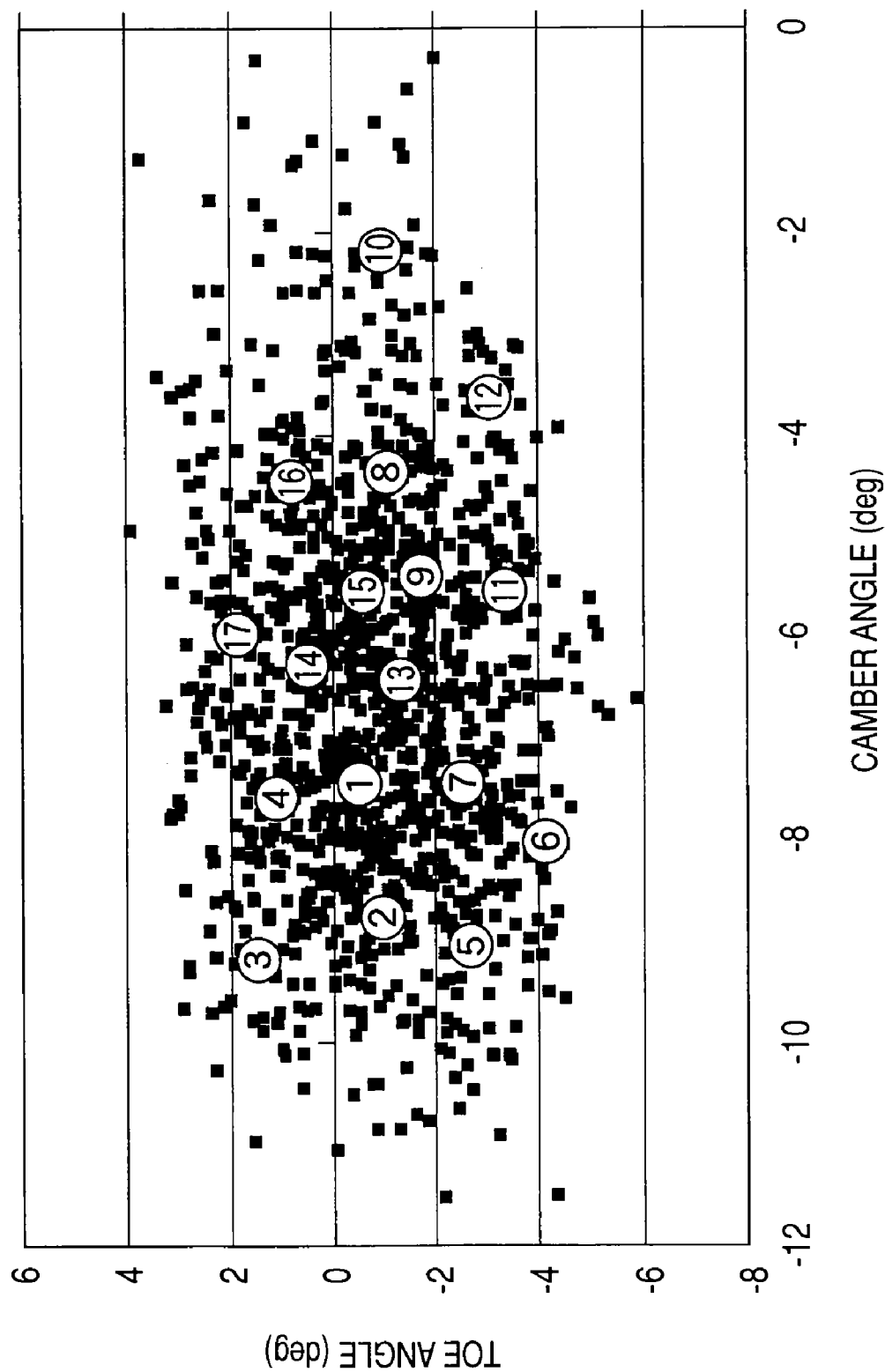
FIG. 32 is a graph illustrating clustered design variables according to the fourth example of the present invention.
Figure 33:
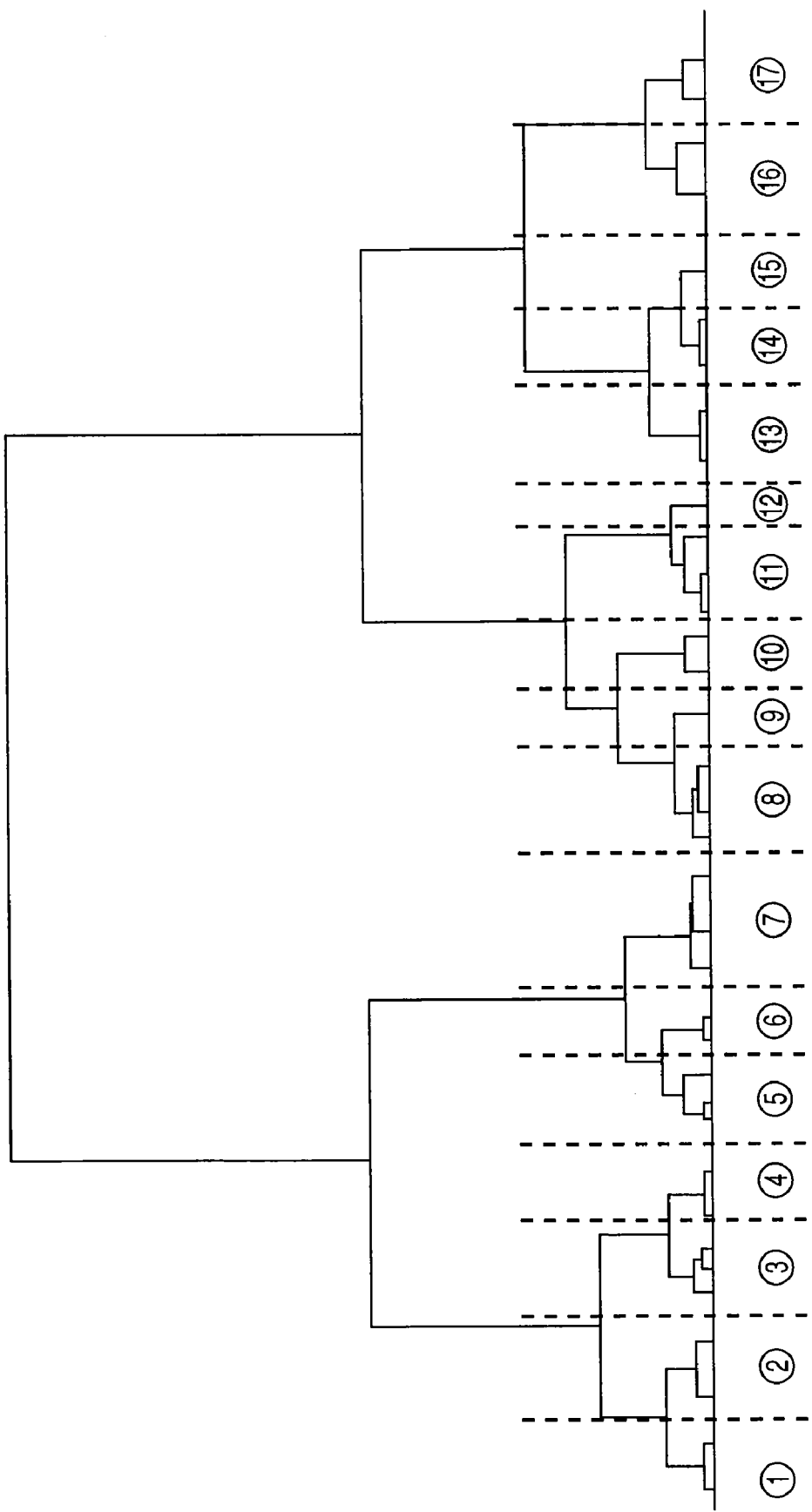
FIG. 33 is a diagram for illustrating hierarchical clustering according to the fourth example of the present invention.
Figure 34:
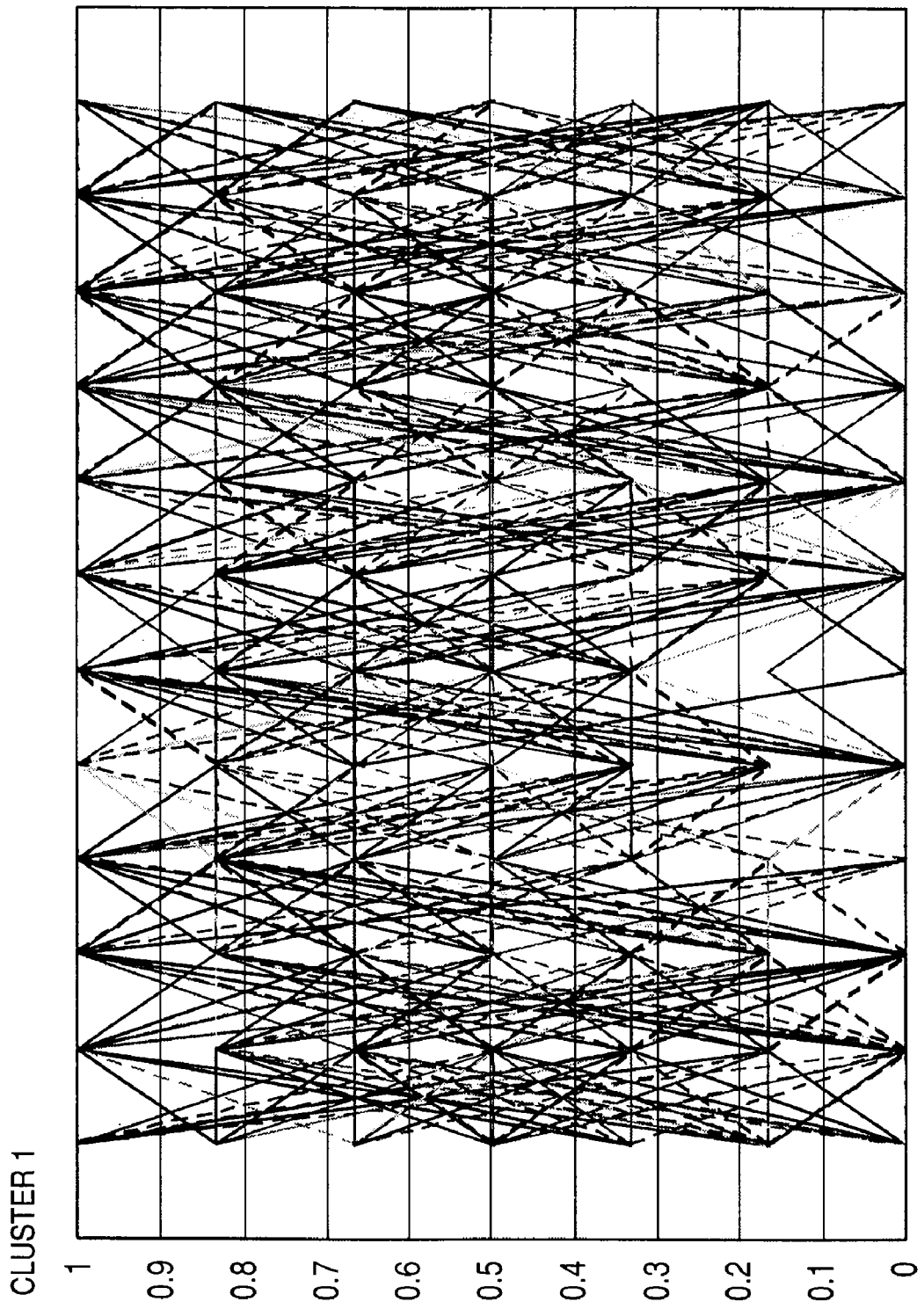
FIG. 34 is a diagram illustrating a concrete example of the design variables according to the fourth example of the present invention.
Figure 35:
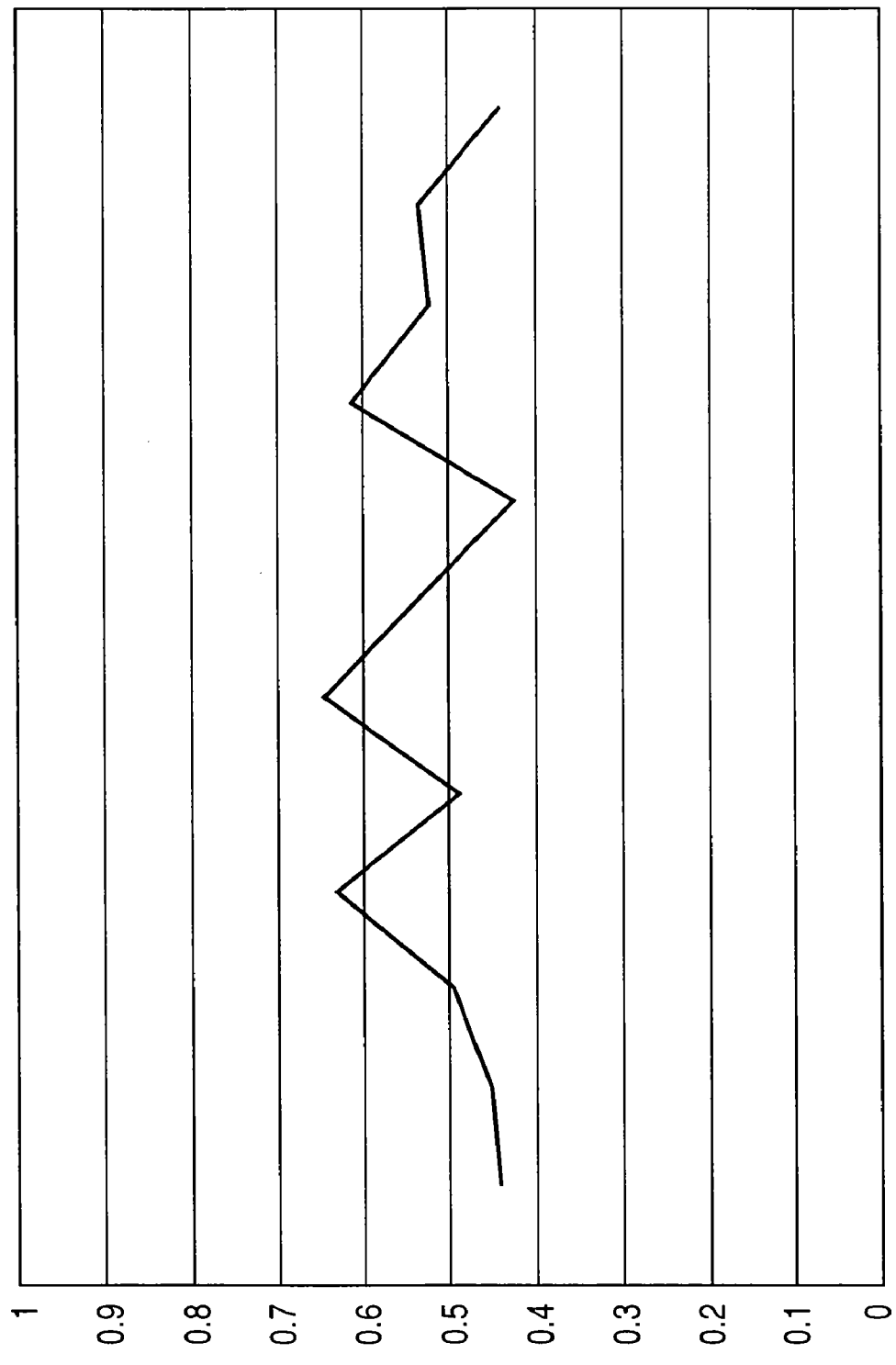
FIG. 35 is a diagram illustrating average values of the design variables according to the fourth example of the present invention.

FIGS. 32 and 33 show the results of the hierarchical clustering according to the present example. Each of the models is classified into a higher rank cluster in order by the clustering unit 14. If the execution of the hierarchical clustering is continued, all of the 128 models are classified into one cluster, and a hierarchized tree diagram shown in the drawing is created. In the present example, models were analyzed using the hierarchy including 17 clusters (1) to (17). The classification using the design variables having high sensitivity to the characteristics of the camber angles and the toe angles as the benchmarks is made to each cluster. In the cluster 1, as shown in FIG. 32, a plurality of design variables is included. The average values of these design variables are shown in FIG. 33. By diagrammatizing the average values of the design variables in this manner, the tendency of the changes of the design variables in each cluster can be easily grasped.

Figure 36:
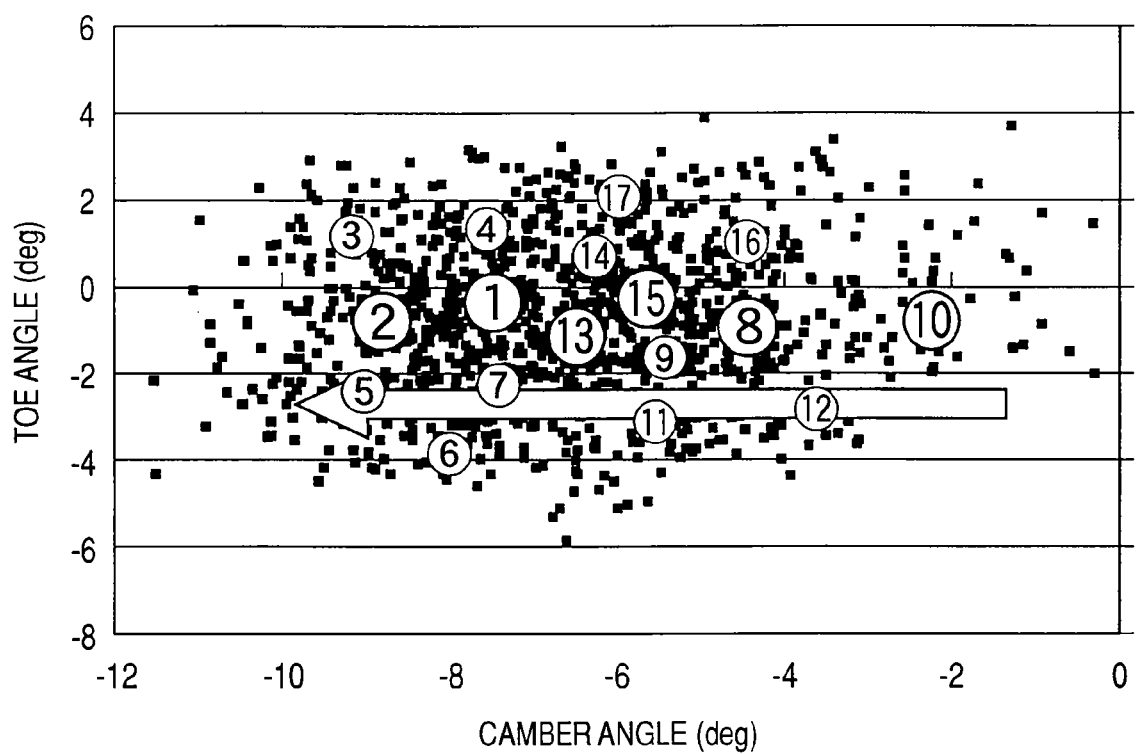
FIG. 36 is a diagram for illustrating the sampling of clusters according to the fourth example of the present invention.

Successively, the clustering unit 14 arranges the clustered models into a space (plane) expressed by each coordinate axis of the toe angles and the camber angles, as shown in FIG. 36. The clustering unit 14 samples the clusters in order along a curved line expressing the predetermined changes of the characteristic values on the cluster group. For example, the clustering unit 14 samples the clusters (10), (8), (15), (13), (1) and (2) in order along a curved line (straight line) on which the toe angles are about "−1," and the camber angles gradually becomes larger. That is, the straight line on which only the camber angles change is supposed, and the clusters are sampled along the straight line.

Figure 37:
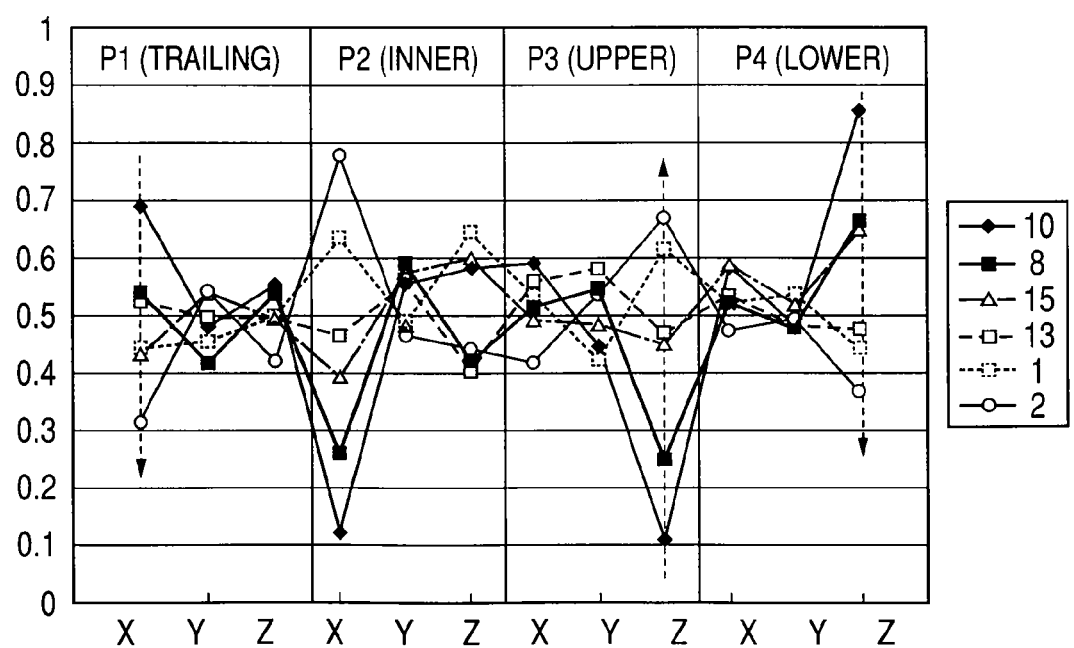
FIG. 37 is a graph illustrating a tendency of the changes of the design variables according to the fourth example of the present invention.

Successively, the principle extraction unit 15 draws the average values of each design variable of the sampled clusters (10), (8), (15), (13), (1) and (2) on a graph, as shown in FIG. 37. If these average values of the design variables are plotted in order in accordance with the order of the aforesaid sampling, then the design variables changes as shown by broken line arrows. From the drawing, it can be confirmed that the camber angles, which are characteristic values, are greatly influenced by the changes of the X-coordinates of the trailing arm junction P1, the Z-coordinates of the lower arm junction P4, and the Z-coordinates of the upper arm junction P3.

Moreover, the X-coordinates of the trailing arm junction P1 and the Z-coordinates of the lower arm junction P4 are gradually reduced, and the Z-coordinates of the upper arm junction P3 are gradually enlarged. That is, in order to suppressing the changes of the toe angles with the camber angles being changed to be a large value gradually, it is conjectured that it is just needed to reduce the X-coordinates of the trailing arm junction P3 and the Z-coordinates of the lower arm junction P4 gradually, and to enlarge the Z-coordinates of the upper arm junction P3 gradually.

Figure 38:
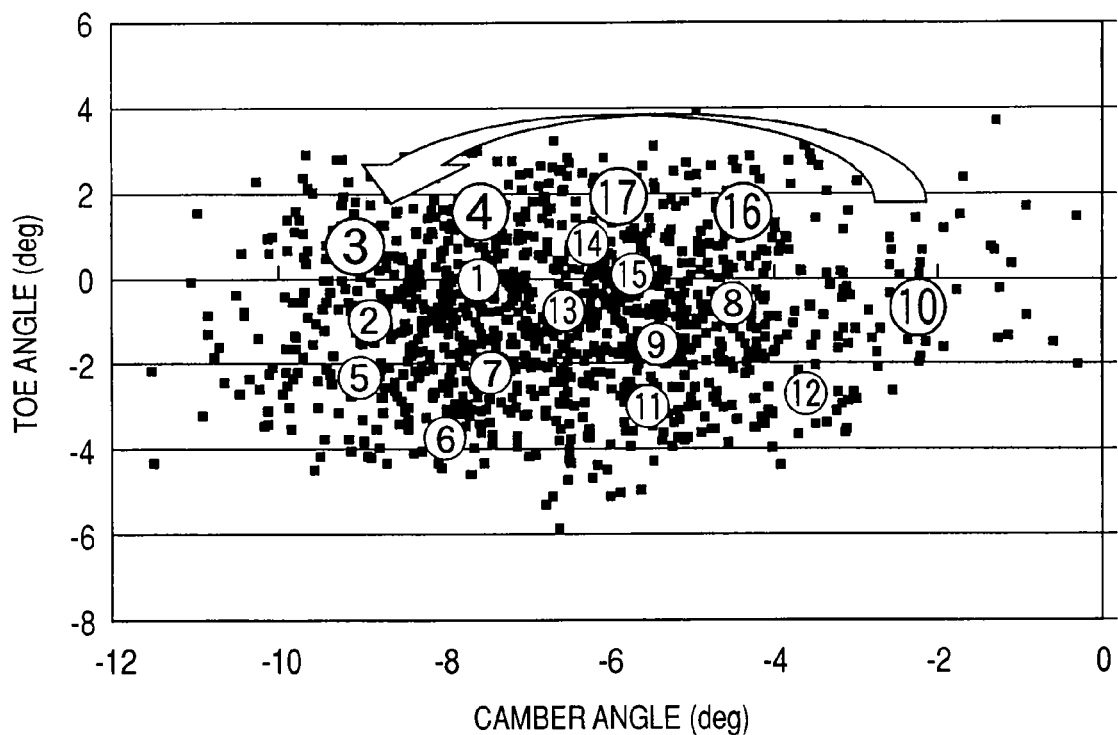
FIG. 38 is a diagram for illustrating the sampling of the clusters according to the fourth example of the present invention.
Figure 39:
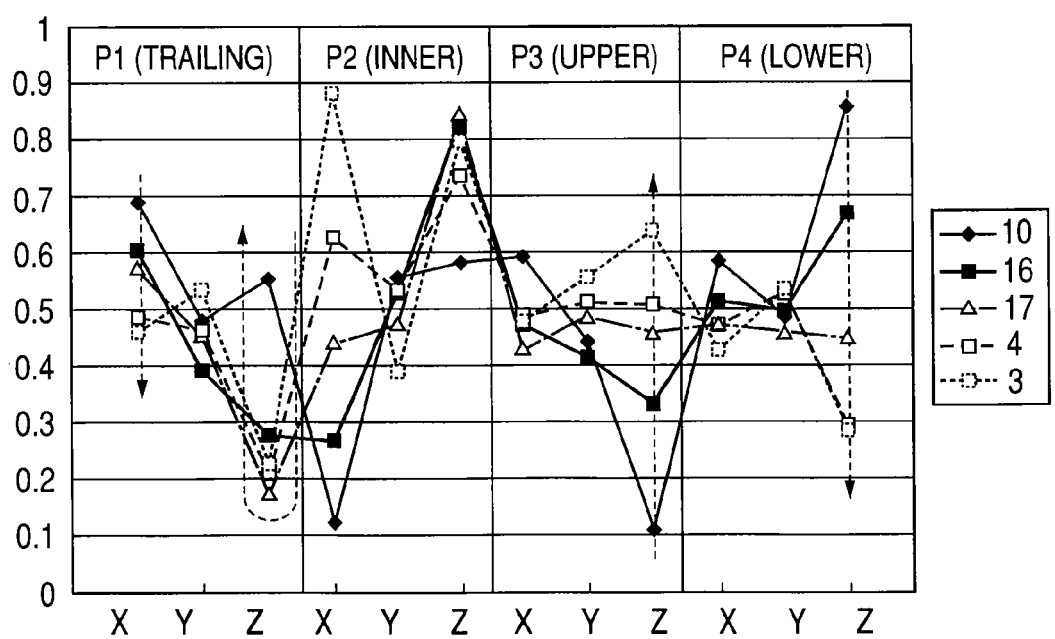
FIG. 39 is a graph illustrating a tendency of the changes of the design variables according to the fourth example of the present invention.
Figure 40:
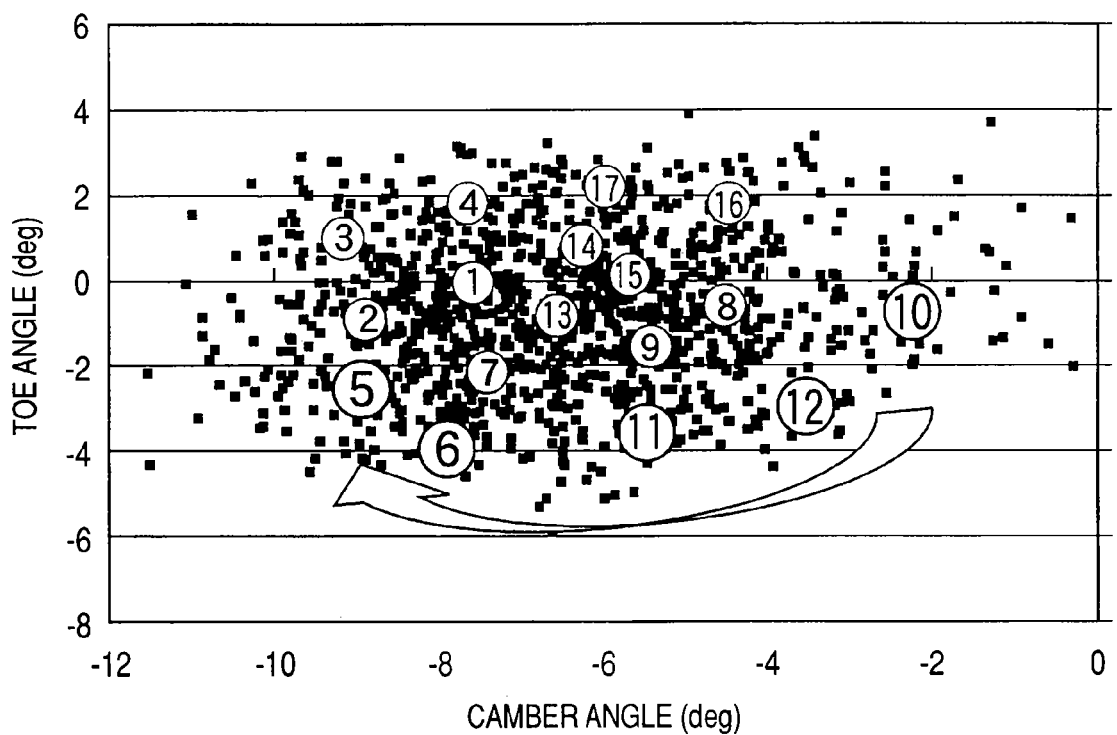
FIG. 40 is a diagram for illustrating the sampling of the clusters according to the fourth example of the present invention.

Moreover, it is supposed that the clusters (10), (16), (17), (4) and (3) are sampled in order along an envelope curve on the upper side of cluster groups as shown in FIG. 38. The envelope curve indicates that the value of the toe angle changes to be 0 degree→2 degrees→0 degree as the camber angle is reduced. In this way, the average values of the design variables of the sampled clusters are shown as FIG. 37. As it can be confirmed from this drawing, the X-coordinates of the junction P1, the Z-coordinates of the junction P3 and the Z-coordinates of the junction P4 show almost the same tendency as those of FIG. 37 mentioned above, but the Z-coordinates of the trailing arm junction P1 increase again after once decreased. That is, it can be confirmed that the changes of the characteristic values as shown by the envelope curve of FIG. 38 are derived by changing the design variables as shown in FIG. 39. Furthermore, it is supposed that the clusters (10), (12), (11), (6) and (5) are sampled in order along the envelope curve on the lower side of the cluster group as shown in FIG. 40. The envelope curve indicates that the value of the toe angle changes from 0 degree→−4 degrees→−2 degrees as the camber angle reduces. The average values of the design variables of the sampled clusters are expressed as FIG. 41. In the case of the sampling by the lower side envelope curve, it can be confirmed that the Z-coordinates of the trailing arm junction P1 reduce again after increased differently from the case of the sampling by the upper side envelope curve.

Figure 41:
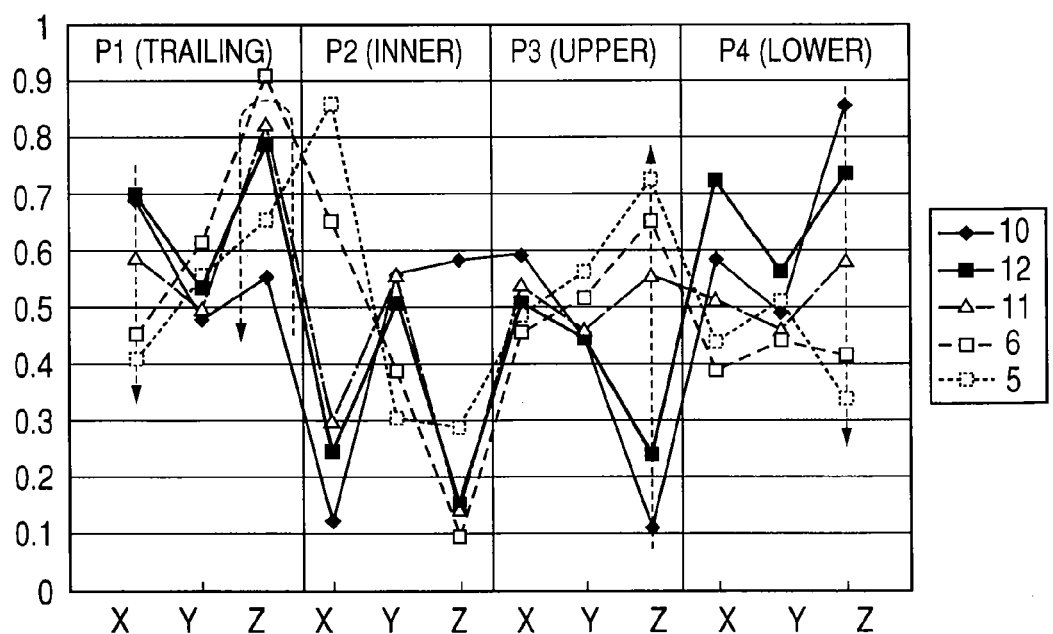
FIG. 41 is a graph illustrating a tendency of the changes of the design variables according to the fourth example of the present invention.

Consequently, from FIGS. 39 and 41, it is derived that the toe angle is greatly influenced by the changes of the Z-coordinates of the trailing arm junction P1. Moreover, the camber angle is greatly influenced by the changes of the X-coordinates of the trailing arm junction P1, the Z-coordinates of the lower arm junction P4 and the Z-coordinates of the upper arm junction P3, as mentioned above.

Incidentally, the setting of the aforesaid sampling curved lines can be performed by the so-called interactive mode with an operator observing the display 108. Furthermore, it is also possible to automatically set the sampling curved lines by the analysis system according to the present example. That is, the analysis system can detect the distribution of the cluster groups shown in FIGS. 36, 38 and 40, and can automatically calculate the characteristic curved lines such as the envelope curves of the cluster groups and the straight lines traversing the cluster groups, and furthermore can sample the clusters along these characteristic curved lines. Thereby, it is possible to perform automatic analysis.

As shown in the present example, it becomes possible to suppose a desired characteristic value curved line in a cluster group, and to sample the clusters along the characteristic value curved line, and thereby to grasp the state of the changes of the design variables occupying the characteristic value curved line. That is, it can be grasped how to set the design variables in order to realize the desired characteristic values, and efficient design can be performed.

In the above, the present embodiment has been described, but the present invention is not limited to the configuration described above, and the present embodiment can be altered without departing from the spirit of the present invention. For example, the present invention is not limited to the aforesaid design fields, but the present invention can be applied to any design fields as long as simulation calculations can be performed in the design fields. For example, the present invention can be applied to wide fields such as an electronic circuit simulation, structure design, software design, stock price estimation, and traffic congestion estimation.

Incidentally, the present invention may be realized not only by installing the software programs for executing the aforesaid processing, but also by downloading such programs from a server or a download site. Moreover, the program software may be installed from a storage medium such as a CD-ROM. Furthermore, an encoded program may be distributed to a user, and a decode key may be informed only to a user who paid a price. Moreover, any operating systems may be adopted as the operating system for executing the program, and the form of the hardware to execute the program does not matter.

The present application claims the priority of Japanese Patent Application No. 2004-310937 filed on Oct. 26, 2004, and Japanese Patent Application No. 2005-066086 filed on Mar. 9, 2005, all of the contents of which are incorporated herein by reference.

The invention claimed is:

1. A multi-variable model analysis system, comprising:
a model creation unit for creating a plurality of models, each model including a plurality of variables;
a characteristic value calculation unit for calculating a characteristic value for each model based on the variables of the model and for writing the variables and the corresponding characteristic values of the models in a memory map;
a clustering unit for classifying models having characteristic values of a high similarity into identical clusters;
a correlation coefficient calculation unit for calculating correlation coefficients of the variables of the models in each cluster and for writing the correlation coefficients in a memory map; and
an extraction unit for extracting a variable having a correlation coefficient exceeding a predetermined value in each cluster from the memory map.

2. The multi-variable model analysis system according to claim 1, wherein
the model creation unit creates the models by determining the plurality of variables using orthogonal tables.

3. The multi-variable model analysis system according to claim 1, wherein
the clustering unit performs clustering of the models having high similarity by classifying models having a minimum distance between their respective characteristic values into an identical cluster.

4. The multi-variable model analysis system according to claim 1, wherein
the correlation coefficient calculation unit calculates the correlation coefficients of the variables by changing variants related to the characteristic values and determining corresponding changes in the variables.

5. The multi-variable model analysis system according to claim 1, wherein
the extraction unit calculates an average value of the correlation coefficients of the variables in a plurality of clusters, and extracts the variable having the average value exceeding the predetermined value from the memory map.

6. The multi-variable model analysis system according to claim 1, further comprising a database for performing preservation and retrieval of the variable extracted by the extraction unit.

7. The multi-variable model analysis system according to claim 1, wherein
the models express vehicle structures.

8. The multi-variable model analysis system according to claim 1, wherein
the model creation unit creates a plurality of orthogonal tables by changing an array of a plurality of factors allocated in an orthogonal table, and creates the plurality of models using the orthogonal tables.

9. The multi-variable model analysis system according to claim 1, wherein
the models express circuit design elements.

10. The multi-variable model analysis system according to claim 1, wherein
the models express network line design structures.

11. A multi-variable model analysis method, a multi-variable model analysis program and a program medium, each comprising:
a model creation step of creating a plurality of models each including a plurality of variables;
a characteristic value calculation step of calculating characteristic values of the models based on the variables of the models and of writing the variables and the characteristic values of the models in a memory map;
a clustering step of classifying models having similar characteristic values into identical clusters;
a correlation coefficient calculation step of calculating correlation coefficients of the variables in each cluster and of writing the correlation coefficients in a memory map; and
an extraction step of extracting a variable having a correlation coefficient exceeding a predetermined value in at least one cluster from the memory map.

12. The multi-variable model analysis method, the multi-variable model analysis program and the program medium according to claim 11, wherein
the model creation step creates the models by determining the plurality of variables using an orthogonal table.

13. The multi-variable model analysis method, the multi-variable model analysis program and the program medium according to claim 11, wherein
the clustering step performs clustering of the models having high similarity by classifying models having a minimum distance between their respective characteristic values into identical clusters.

14. The multi-variable model analysis method, the multi-variable model analysis program and the program medium according to claim 11, wherein
the correlation coefficient calculation step calculates the correlation coefficients of the variables by changing variants related to the characteristic values.

15. The multi-variable model analysis method, the multi-variable model analysis program and the program medium according to claim 11, wherein the extraction step calculates an average value of the correlation coefficients of the variables in a plurality of clusters, and extracts the variable having the average value exceeding the predetermined value from the memory map.

16. The multi-variable model analysis method, the multi-variable model analysis program and the program medium according to claim 11, wherein the model creation step creates a plurality of orthogonal tables by changing an array of a plurality of factors allocated in an orthogonal table, and creates the plurality of models using the orthogonal tables.

17. A multi-variable model analysis system, comprising:

a model creation unit for creating a plurality of models each including a plurality of variables;

a characteristic value calculation unit for calculating a characteristic value for each model on the basis of the variables of the model and for writing the variables and the corresponding characteristic values of the models in a memory map;

a clustering unit for creating a cluster group by classifying the models having characteristic values of a high similarity into identical clusters, the clustering unit disposing the cluster group in a space having the characteristic values as coordinate axes to sample clusters situated on a straight line, a curved line or a plane, each of which shows a desired characteristic value change in the cluster group; and a principle extraction unit for determining how an average value of the variables of the models included in each sampled cluster changes in accordance with an order of the sampling by the clustering unit.

18. The multi-variable model analysis system according to claim 17, wherein the model creation unit creates a plurality of orthogonal tables by changing an array of a plurality of factors allocated in an orthogonal table, and creates the plurality of models using the orthogonal tables.

* * * * *